United States Patent
Miyakoshi et al.

(10) Patent No.: US 10,712,066 B2
(45) Date of Patent: Jul. 14, 2020

(54) VEHICLE AIR CONDITIONER

(71) Applicant: Sanden Holdings Corporation, Isesaki-shi, Gunma (JP)

(72) Inventors: Ryo Miyakoshi, Isesaki (JP); Kenichi Suzuki, Isesaki (JP)

(73) Assignee: SANDEN HOLDINGS CORPORATION, Isesaki-shi, Gunma (JP)

( * ) Notice: Subject to any disclaimer, the term of this patent is extended or adjusted under 35 U.S.C. 154(b) by 110 days.

(21) Appl. No.: 15/935,855

(22) Filed: Mar. 26, 2018

(65) Prior Publication Data
US 2018/0209708 A1 Jul. 26, 2018

Related U.S. Application Data

(62) Division of application No. 14/913,274, filed as application No. PCT/JP2014/071834 on Aug. 21, 2014, now abandoned.

(30) Foreign Application Priority Data

Aug. 23, 2013 (JP) .................................. 2013-173238

(51) Int. Cl.
*F25B 47/02* (2006.01)
*B60H 1/00* (2006.01)
(Continued)

(52) U.S. Cl.
CPC ....... *F25B 47/022* (2013.01); *B60H 1/00385* (2013.01); *B60H 1/00807* (2013.01);
(Continued)

(58) Field of Classification Search
CPC ............ B60H 1/00785; B60H 1/00878; B60H 1/00385; B60H 1/00921; F25B 49/02;
(Continued)

(56) References Cited

U.S. PATENT DOCUMENTS

2012/0227428 A1 9/2012 Yokoo et al.
2013/0312436 A1* 11/2013 Chen ...................... F25B 47/025
62/81

FOREIGN PATENT DOCUMENTS

DE    10 2012 203 564 A1    9/2012
JP         S60-223940 A     11/1985
(Continued)

OTHER PUBLICATIONS

Translation of JP2007051839A (Year: 2007).*
(Continued)

*Primary Examiner* — Marc E Norman
*Assistant Examiner* — Schyler S Sanks
(74) *Attorney, Agent, or Firm* — Baker Botts L.L.P.

(57) ABSTRACT

There is disclosed a vehicle air conditioner of a heat pump system in which there is prevented or inhibited frosting to an outdoor heat exchanger when heating in a vehicle interior is beforehand performed during plug-in, thereby achieving comfortable heating in the vehicle interior during running and also extending a running distance. The vehicle air conditioner includes an injection circuit 40 which distributes a refrigerant flowing out from a radiator 4 to return the refrigerant to the middle of compression by a compressor 2, a controller has frosting estimation means for estimating the frosting to an outdoor heat exchanger 7, and when a heating mode is executed in a state where a power is supplied from an external power source to the compressor 2 or to a battery which supplies the power to drive the compressor 2, the injection circuit 40 performs gas injection to the compressor 2 in a case where the frosting to the outdoor heat exchanger 7 is predicted.

7 Claims, 15 Drawing Sheets

(51) Int. Cl.
    *F25B 49/02*     (2006.01)
    *F25B 41/04*     (2006.01)
    *F25B 41/06*     (2006.01)
    *F25B 31/00*     (2006.01)
    *F25B 5/04*     (2006.01)
    *F25B 6/04*     (2006.01)
    *F25B 40/00*     (2006.01)

(52) U.S. Cl.
    CPC ..... *B60H 1/00914* (2013.01); *B60H 1/00921* (2013.01); *F25B 31/008* (2013.01); *F25B 41/04* (2013.01); *F25B 41/062* (2013.01); *F25B 49/02* (2013.01); *F25B 49/022* (2013.01); *B60H 2001/00961* (2019.05); *F25B 5/04* (2013.01); *F25B 6/04* (2013.01); *F25B 40/00* (2013.01); *F25B 2341/0662* (2013.01); *F25B 2400/0409* (2013.01); *F25B 2400/0411* (2013.01); *F25B 2400/05* (2013.01); *F25B 2600/0253* (2013.01)

(58) Field of Classification Search
    CPC .. F25B 2700/21175; F25B 2700/21151; F25B 47/00; F25B 47/02; F25B 47/006; F25B 2347/02; F25D 21/02; F25D 21/00; F25D 21/04; F25D 21/06
See application file for complete search history.

(56) References Cited

FOREIGN PATENT DOCUMENTS

| | | | |
|---|---|---|---|
| JP | H09-061020 A | | 3/1997 |
| JP | H09-142139 A | | 6/1997 |
| JP | 2001-324237 A | | 11/2001 |
| JP | 2001324237 A | * | 11/2001 |
| JP | 2007051839 A | * | 3/2007 |
| JP | 3985384 B2 | | 10/2007 |
| JP | 2009228928 A | * | 10/2009 |
| JP | 2012-013363 A | | 1/2012 |
| JP | 2013-139252 A | | 7/2013 |
| WO | 2007/114243 A1 | | 10/2007 |

OTHER PUBLICATIONS

Translation of JP2001324237A (Year: 2001).*
Translation of JP2009228928A (Year: 2009).*
The State Intellectual Property Office of People's Republic of China, First Office Action for Chinese Application No. 201480046667.3, dated Jan. 4, 2017.
Japan Patent Office, First Notification of Reasons for Refusal for Patent Application No. JP 2013-173238, dated Jun. 6, 2017.
German Patent and Trade Mark Office; Office Action issued in German Patent Application No. DE 11 2014 003 867.9, dated Apr. 17, 2020.

* cited by examiner

VEHICLE AIR CONDITIONER

CROSS-REFERENCE TO RELATED APPLICATIONS

The present application is a divisional of U.S. patent application Ser. No. 14/913,274, which was filed on Feb. 19, 2016, which is a U.S. National Stage Patent Application under 37 U.S.C. § 371 of International Patent Application No. PCT/JP2014/071834, filed on Aug. 21, 2014, which claims the benefit of Japanese Patent Application No. JP 2013-173238, filed on Aug. 23, 2013, the disclosures of which are incorporated herein by reference in their entirety.

TECHNICAL FIELD

The present invention relates to a vehicle air conditioner of a so-called heat pump system which conditions air in a vehicle interior, and more particularly, it relates to a vehicle air conditioner of a hybrid car or an electric car to which a power can be supplied from an external power source.

BACKGROUND ART

Due to actualization of environmental problems in recent years, hybrid cars and electric cars have spread. Furthermore, as an air conditioner which is applicable to such a vehicle, there has been developed an air conditioner which includes a compressor to compress and discharge a refrigerant, a radiator (a condenser) disposed on a vehicle interior side to let the refrigerant radiate heat, a heat absorber (an evaporator) disposed on the vehicle interior side to let the refrigerant absorb heat, and an outdoor heat exchanger disposed outside the vehicle interior to let the refrigerant radiate or absorb heat, and which changes and executes respective modes such as a heating mode in which the refrigerant discharged from the compressor radiates heat in the radiator and the refrigerant by which heat has been radiated in this radiator absorbs heat in the outdoor heat exchanger, a dehumidifying mode in which the refrigerant discharged from the compressor radiates heat in the radiator and the refrigerant by which heat has been radiated in the radiator absorbs heat in the heat absorber, and a cooling mode in which the refrigerant discharged from the compressor radiates heat in the outdoor heat exchanger and absorbs heat in the heat absorber (e.g., see Patent Document 1).

Additionally, an electric car or part of hybrid cars is connected to an external power source (a charger) installed at home or in a power supply facility (a power supply point), whereby a battery can be charged (so-called plug-in). When the battery is charged by such plug-in, the present invention can contribute to fuel efficiency improvement especially in the hybrid car.

CITATION LIST

Patent Documents

Patent Document 1: Japanese Patent No. 3985384

SUMMARY OF THE INVENTION

Problems to be Solved by the Invention

Here, when a compressor is driven during running, a power of a battery is wasted. Therefore, when a vehicle interior is beforehand heated (preliminary air conditioning) before the running in a connected state to an external power source (a plug-in state), it is possible to extend the subsequent running distance.

However, in the above heating mode, an outdoor heat exchanger functions as an evaporator of a refrigerant. Therefore, when the compressor is operated directly or via the battery by the external power source during plug-in to execute the heating mode, water in outdoor air adheres as frost to the outdoor heat exchanger depending on conditions of a temperature/humidity of the outdoor air, and grows therein. In a case where frosting to the outdoor heat exchanger occurs in the heating mode, the frost becomes an insulating material, a heat exchange performance with the outdoor air therefore remarkably deteriorates, heat cannot be absorbed from the outdoor air, and a required heating capability cannot be obtained.

When the running starts in such a state, compressor operation time for the heating during the running lengthens to increase power consumption. Additionally, an auxiliary electric heater has to be used to complement the heating capability, and hence, the power consumption increases in any case, thereby causing the problem that the running distance is shortened.

The present invention has been developed to solve such a conventional technical problem, and an object thereof is to provide a vehicle air conditioner of a so-called heat pump system in which there is prevented or inhibited frosting to an outdoor heat exchanger when heating in a vehicle interior is beforehand performed during plug-in, thereby achieving comfortable heating in the vehicle interior during running and also extending a running distance.

Means for Solving the Problems

A vehicle air conditioner of the present invention includes a compressor which compresses a refrigerant; an air flow passage through which air to be supplied to a vehicle interior flows; a radiator which lets the refrigerant radiate heat to heat the air to be supplied from the air flow passage to the vehicle interior; a heat absorber which lets the refrigerant absorb heat to cool the air to be supplied from the air flow passage to the vehicle interior; an outdoor heat exchanger disposed outside the vehicle interior to let the refrigerant radiate heat or absorb heat; and control means, and the vehicle air conditioner executes at least a heating mode in which this control means lets the refrigerant discharged from the compressor radiate heat in the radiator, decompresses the refrigerant by which heat has been radiated, and then lets the refrigerant absorb heat in the outdoor heat exchanger, and the vehicle air conditioner includes an injection circuit which distributes the refrigerant flowing out from the radiator to return the refrigerant to the middle of the compression by the compressor, the vehicle air conditioner being characterized in that the control means has frosting estimation means for estimating frosting to the outdoor heat exchanger, and when the heating mode is executed in a state where a power is supplied from an external power source to the compressor or a battery which supplies the power to drive the compressor, the control means operates the injection circuit, and executes gas injection to return the refrigerant to the middle of the compression by the compressor, in a case where the frosting to the outdoor heat exchanger is predicted on the basis of the estimation of the frosting estimation means.

The vehicle air conditioner of the invention of claim 2 is characterized in that in the above invention, the control means suppresses a number of revolution of the compressor to a predetermined value or less, and increases a gas injection amount by the injection circuit, in the case where the frosting to the outdoor heat exchanger is predicted.

The vehicle air conditioner of the invention of claim 3 is characterized in that in the above invention, the control means raises a subcool degree of the refrigerant in the radiator and/or decreases a volume of the air to be passed through the air flow passage, in the case where the frosting to the outdoor heat exchanger is predicted.

The vehicle air conditioner of the invention of claim 4 is characterized in that in the above respective inventions, the control means decreases a volume of the air to be passed through the outdoor heat exchanger, in the case where the frosting to the outdoor heat exchanger is predicted.

The vehicle air conditioner of the invention of claim 5 is characterized in that in the above respective inventions, the control means compares a requested heating capability Qtgt as the heating capability of the radiator which is requested with a heating capability Qmaxhp generable by the radiator in a case where it is predicted that the outdoor heat exchanger is not frosted, on the basis of the estimation of the frosting estimation means, and the control means executes the gas injection by the injection circuit in a case where the heating capability Qmaxhp runs shorter than the requested heating capability Qtgt.

The vehicle air conditioner of the invention of claim 6 is characterized in that in the above respective inventions, the frosting estimation means calculates a maximum heating capability predicted value without frosting TGQhpNfst which is a target value of the maximum heating capability generable by the radiator in a range in which the outdoor heat exchanger is not frosted, and the frosting estimation means predicts that the outdoor heat exchanger is frosted in a case where the maximum heating capability predicted value without frosting TGQhpNfst is smaller than the requested heating capability Qtgt as the heating capability of the radiator which is requested or a value close to the requested heating capability Qtgt.

The vehicle air conditioner of the invention of claim 7 is characterized in that in the above invention, the frosting estimation means calculates the maximum heating capability predicted value without frosting TGQhpNfst on the basis of an outdoor air temperature, or time, solar radiation, a rainfall, a location and weather conditions in addition to the outdoor air temperature.

The vehicle air conditioner of a particular embodiment is characterized in that in the inventions of claim 1 to claim 5, the frosting estimation means calculates a requested refrigerant evaporation temperature in non-frosting TXObaseQtgt which is a refrigerant evaporation temperature of the outdoor heat exchanger when the requested heating capability Qtgt as the heating capability of the radiator which is requested is achieved, and the frosting estimation means predicts that the outdoor heat exchanger is frosted in a case where the requested refrigerant evaporation temperature in non-frosting TXObaseQtgt is lower than a frost point Tfrost or a temperature close to the frost point Tfrost.

The vehicle air conditioner of a particular embodiment is characterized in that in the above invention, the frosting estimation means calculates the requested refrigerant evaporation temperature in non-frosting TXObaseQtgt on the basis of the outdoor air temperature and the requested heating capability Qtgt.

The vehicle air conditioner of a particular embodiment is characterized in that in the above respective inventions, the injection circuit has decompressing means, and a heat exchanger which performs heat exchange between the refrigerant decompressed by the decompressing means and the refrigerant discharged from the compressor before flowing into the radiator or the refrigerant flowing out from this radiator.

Advantageous Effect of the Invention

According to the present invention, a vehicle air conditioner includes a compressor which compresses a refrigerant; an air flow passage through which air to be supplied to a vehicle interior flows; a radiator which lets the refrigerant radiate heat to heat the air to be supplied from the air flow passage to the vehicle interior; a heat absorber which lets the refrigerant absorb heat to cool the air to be supplied from the air flow passage to the vehicle interior; an outdoor heat exchanger disposed outside the vehicle interior to let the refrigerant radiate heat or absorb heat; and control means, and the vehicle air conditioner executes at least a heating mode in which this control means lets the refrigerant discharged from the compressor radiate heat in the radiator, decompresses the refrigerant by which heat has been radiated, and then lets the refrigerant absorb heat in the outdoor heat exchanger. The vehicle air conditioner includes an injection circuit which distributes the refrigerant flowing out from the radiator to return the refrigerant to the middle of the compression by the compressor, the control means has frosting estimation means for estimating frosting to the outdoor heat exchanger, and when the heating mode is executed in a state where a power is supplied from an external power source to the compressor or a battery which supplies the power to drive the compressor, the control means operates the injection circuit, and executes gas injection to return the refrigerant to the middle of the compression by the compressor, in a case where the frosting to the outdoor heat exchanger is predicted on the basis of the estimation of the frosting estimation means. Therefore, when the vehicle interior is beforehand heated (preliminary air conditioning) during so-called plug-in, the gas injection is performed by the injection circuit in the middle of the compression by the compressor, and an amount of the refrigerant to be discharged from the compressor is increased by the gas injection while suppressing the heat absorption in the outdoor heat exchanger to prevent or inhibit the frosting to the outdoor heat exchanger. Consequently, it is possible to acquire a heating capability in the vehicle interior by the radiator, and it is possible to decrease loads during the subsequent running.

In consequence, it is possible to extend a running distance of an electric car or a hybrid car while maintaining the vehicle interior after start of running at a comfortable temperature.

Additionally, according to the invention of claim 2, in addition to the above invention, the control means suppresses a number of revolution of the compressor to a predetermined value or less, and increases a gas injection amount by the injection circuit, in the case where the frosting to the outdoor heat exchanger is predicted. Therefore, a quantity of heat to be absorbed in the outdoor heat exchanger can securely be suppressed, thereby making it possible to effectively prevent or inhibit the frosting.

In this case, as in the invention of claim 3, the control means raises a subcool degree of the refrigerant in the radiator and/or decreases a volume of the air to be passed through the air flow passage, in the case where the frosting to the outdoor heat exchanger is predicted, so that a pressure rise on a high pressure side can be promoted. In consequence, it is possible to acquire the heating capability of the radiator in a situation where the number of revolution of the compressor decreases.

Additionally, as in the invention of claim 4, the control means decreases a volume of the air to be passed through the outdoor heat exchanger, in the case where the frosting to the outdoor heat exchanger is predicted. In consequence, a volume of outdoor air to the outdoor heat exchanger can be suppressed, thereby making it possible to further effectively prevent or inhibit the frosting of the outdoor heat exchanger due to coagulation of water in the outdoor air.

Additionally, as in the invention of claim 5, the control means compares a requested heating capability Qtgt as the heating capability of the radiator which is requested with a heating capability Qmaxhp generable by the radiator in a case where it is predicted that the outdoor heat exchanger is not frosted, on the basis of the estimation of the frosting estimation means, and the control means executes the gas injection by the injection circuit in a case where the heating capability Qmaxhp runs shorter than the requested heating capability Qtgt. In consequence, the gas injection to the compressor can suitably be controlled. For example, as in a particular embodiment, heat exchange is performed between the refrigerant discharged from the compressor before flowing into the radiator and the refrigerant of the injection circuit, and deterioration of an efficiency during evaporating the refrigerant of the injection circuit can be inhibited.

Further, as in the invention of claim 6, the frosting estimation means calculates a maximum heating capability predicted value without frosting TGQhpNfst which is a target value of the maximum heating capability generable by the radiator in a range in which the outdoor heat exchanger is not frosted, and the frosting estimation means predicts that the outdoor heat exchanger is frosted in a case where the maximum heating capability predicted value without frosting TGQhpNfst is smaller than the requested heating capability Qtgt or a value close to the requested heating capability Qtgt. In consequence, also in a case where a so-called frost point at which the outdoor heat exchanger is frosted cannot be detected, it is possible to effectively prevent or inhibit the frosting to the outdoor heat exchanger during the plug-in.

In this case, as in the invention of claim 7, the frosting estimation means calculates the maximum heating capability predicted value without frosting TGQhpNfst on the basis of an outdoor air temperature, or time, solar radiation, a rainfall, a location and weather conditions in addition to the outdoor air temperature. In consequence, the maximum heating capability predicted value without frosting TGQhpNfst at which the outdoor heat exchanger is not frosted can precisely be estimated. That is, as a result, the frost point can precisely be estimated, thereby making it possible to further effectively prevent or inhibit the frosting to the outdoor heat exchanger during the plug-in.

On the other hand, as in a particular embodiment, the frosting estimation means calculates a requested refrigerant evaporation temperature in non-frosting TXObaseQtgt which is a refrigerant evaporation temperature of the outdoor heat exchanger when the requested heating capability Qtgt is achieved, and the frosting estimation means predicts that the outdoor heat exchanger is frosted in a case where the requested refrigerant evaporation temperature in non-frosting TXObaseQtgt is lower than a frost point Tfrost or a temperature close to the frost point Tfrost. In consequence, it is possible to effectively prevent or inhibit the frosting to the outdoor heat exchanger during the plug-in on the basis of the frost point at which the outdoor heat exchanger is frosted.

In this case, as in a particular embodiment, the frosting estimation means calculates the requested refrigerant evaporation temperature in non-frosting TXObaseQtgt on the basis of the outdoor air temperature and the requested heating capability Qtgt. In consequence, it is possible to precisely estimate the requested refrigerant evaporation temperature in non-frosting TXObaseQtgt which achieves the requested heating capability Qtgt when the outdoor heat exchanger is not frosted, and it is possible to further effectively prevent or inhibit the frosting to the outdoor heat exchanger during the plug-in.

Additionally, as in a particular embodiment, the injection circuit is constituted of decompressing means, and a heat exchanger which performs the heat exchange between the refrigerant decompressed by this decompressing means and the refrigerant discharged from the compressor before flowing into the radiator or the refrigerant flowing out from this radiator, so that the refrigerant to be returned to the middle of the compression by the compressor can be evaporated in the heat exchanger. Especially in this case, when the heat exchange is performed with the refrigerant discharged from the compressor before flowing into the radiator, the refrigerant to be returned to the middle of the compression by the compressor can be evaporated by a higher-temperature refrigerant, and hence, the gas injection amount can sufficiently be acquired and the increase of the amount of the refrigerant to be discharged from the compressor can be achieved.

MODE FOR CARRYING OUT THE INVENTION

Hereinafter, embodiments of the present invention will be described in detail with reference to the drawings.

Embodiment 1

Figure 1:
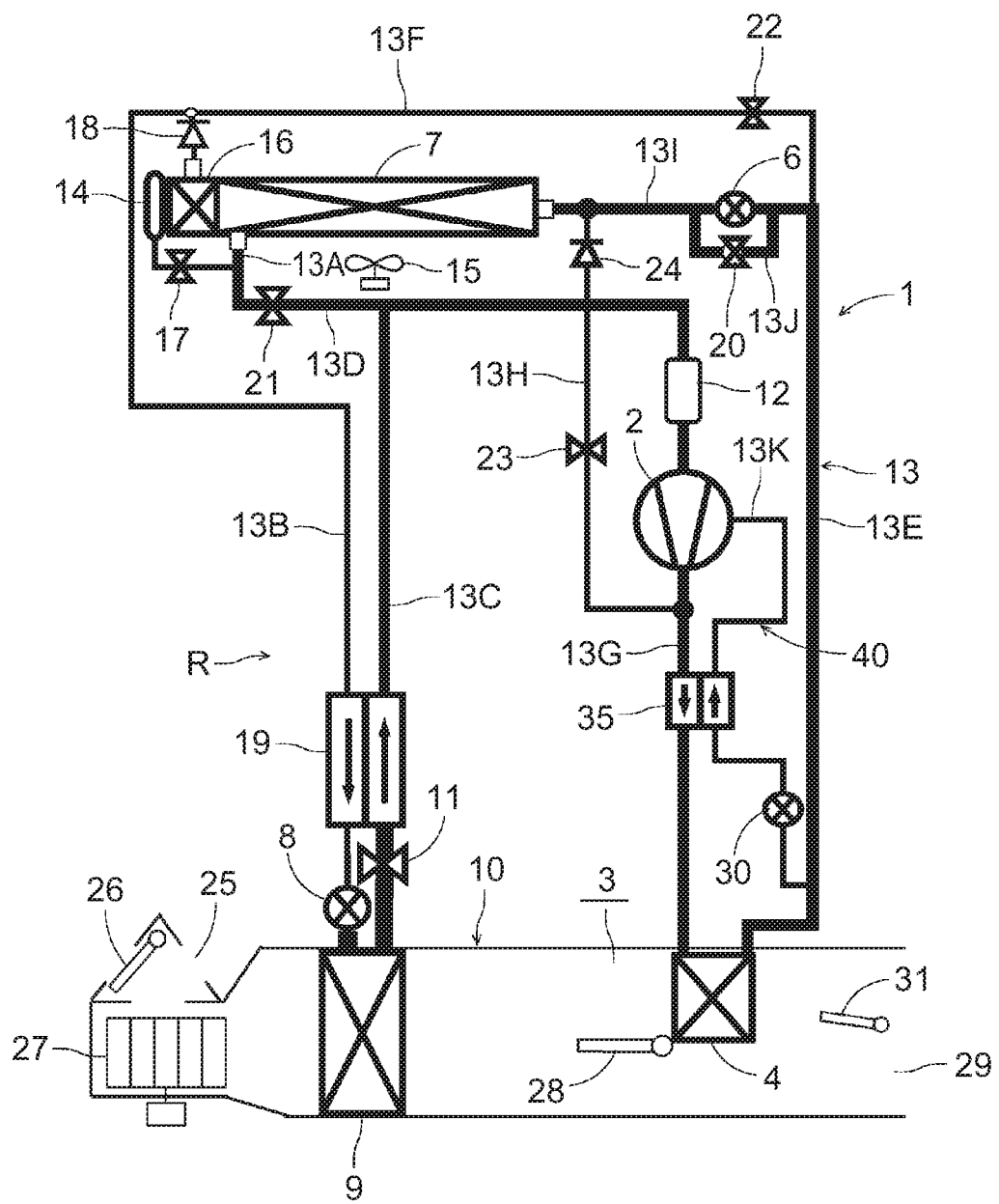
FIG. 1 is a constitutional view of a vehicle air conditioner of one embodiment to which the present invention is applied.

FIG. 1 shows a constitutional view of a vehicle air conditioner 1 of one embodiment of the present invention. A vehicle of the embodiment to which the present invention is applied is an electric car (EV) which does not have an engine (an internal combustion engine), and runs by driving an electric motor for running by a power charged (plug-in) in a battery from an external power source (which is not shown), and the vehicle air conditioner 1 of the present invention is also driven by the power of the battery. That is, in the electric car in which heating cannot be performed by waste heat of the engine, the vehicle air conditioner 1 of the embodiment performs the heating by a heat pump operation in which a refrigerant circuit is used, and further selectively executes respective operation modes of dehumidifying and heating, cooling and dehumidifying, cooling, and the like.

It is to be noted that the vehicle is not limited to the electric car, and the present invention is also effective for a so-called hybrid car in which the engine is used together with the electric motor for the running and in which so-called plug-in to charge the battery from the external power source is possible.

The vehicle air conditioner 1 of the embodiment performs air conditioning (heating, cooling, dehumidifying, and ventilation) in a vehicle interior of the electric car, and there are successively connected, by a refrigerant pipe 13, an electric compressor 2 which compresses a refrigerant, a radiator 4 disposed in an air flow passage 3 of an HVAC unit 10 in which air in the vehicle interior is passed and circulated, to let the high-temperature high-pressure refrigerant discharged from the compressor 2 radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which adjusts an evaporation capability in the heat absorber 9, an accumulator and the like, so that a refrigerant circuit R is constituted. It is to be noted that in the outdoor heat exchanger 7, an outdoor blower 15 is disposed which performs the heat exchange between the outdoor air and the refrigerant.

In addition, the outdoor heat exchanger 7 has a receiver drier portion 14 and a subcooling portion 16 successively on a refrigerant downstream side, a refrigerant pipe 13A extended out from the outdoor heat exchanger 7 is connected to the receiver drier portion 14 via a solenoid valve (an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during the heating. Furthermore, a refrigerant pipe 13E on an outlet side of the radiator 4 is branched before the outdoor expansion valve 6, and this branched refrigerant pipe 13F communicates to be connected to the refrigerant pipe 13B on the downstream side of the check valve 18 via a solenoid valve (an opening/closing valve) 22 to be opened during the dehumidifying.

In addition, a bypass pipe 13J is connected in parallel with the outdoor expansion valve 6, and in the bypass pipe 13J, there is disposed a solenoid valve (an opening/closing valve) 20 which is opened in a cooling mode and bypasses the outdoor expansion valve 6 to pass the refrigerant. Furthermore, a bypass pipe 13G on a discharge side of the compressor 2 is branched, this branched bypass pipe 13H is opened in a defrosting mode to perform defrosting of the outdoor heat exchanger 7, and the bypass pipe communicates to be connected to a bypass pipe 13I between a parallel circuit of the outdoor expansion valve 6 with the bypass pipe 13J and the outdoor heat exchanger 7 via a solenoid valve (an opening/closing valve) 23 and a check valve 24 disposed so that the high-temperature refrigerant (a hot gas) discharged from the compressor 2 directly flows into the outdoor heat exchanger 7. The solenoid valve 23 constitutes defrosting means. It is to be noted that a bypass pipe 13I direction of the check valve 24 is a forward direction.

Additionally, the refrigerant pipe 13E immediately after the pipe is extended out from the radiator 4 (before the pipe is branched into the refrigerant pipes 13F and 13I) is branched, and this branched refrigerant pipe 13K communicates to be connected to the middle of compression by the compressor 2 via an injection expansion valve 30 constituted of an electric valve for injection control. Further, the refrigerant pipe 13K between an outlet side of the injection expansion valve 30 and the compressor 2 is disposed in a heat exchange relation with the refrigerant pipe 13G positioned on the discharge side of the compressor 2, and both the pipes constitute a discharge side heat exchanger (a heat exchanger in the present invention) 35. It is to be noted that in the embodiment, the discharge side heat exchanger 35 is constituted between the discharge side of the compressor 2 and an inlet side of the radiator 4, but the heat exchanger may be disposed on the outlet side of the radiator 4.

The refrigerant pipe 13K, the injection expansion valve 30 and the discharge side heat exchanger 35 constitute an injection circuit 40. The injection circuit 40 is a circuit which distributes a part of the refrigerant flowing out from the radiator 4 to return the part of the refrigerant to the middle of the compression by the compressor 2 (gas injection).

Additionally, the injection expansion valve 30 decompresses the refrigerant flowing into the refrigerant pipe 13K, and then the refrigerant flows into the discharge side heat exchanger 35. The refrigerant flowing into the discharge side heat exchanger 35 is discharged from the compressor 2 to the refrigerant pipe 13G, performs heat exchange with the refrigerant before flowing into the radiator 4, and absorbs heat from the refrigerant flowing through the refrigerant pipe 13G to evaporate. In the discharge side heat exchanger 35, the refrigerant distributed to the refrigerant pipe 13K evaporates, whereby the gas injection into the compressor 2 is performed.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Further, on an air downstream side of the suction changing damper 26, an indoor blower (a blower fan) 27 is disposed to supply the introduced indoor air or outdoor air to the air flow passage 3.

Additionally, in the air flow passage 3 on the air upstream side of the radiator 4, an air mix damper 28 is disposed to adjust a degree of flow of the indoor air or the outdoor air through the radiator 4. Furthermore, in the air flow passage 3 on an air downstream side of the radiator 4, each outlet of foot, vent or defroster (represented by an outlet 29 in FIG. 1) is formed, and in the outlet 29, an outlet changing damper 31 is disposed to perform changing control of blowing of the air from each outlet mentioned above.

Figure 2:
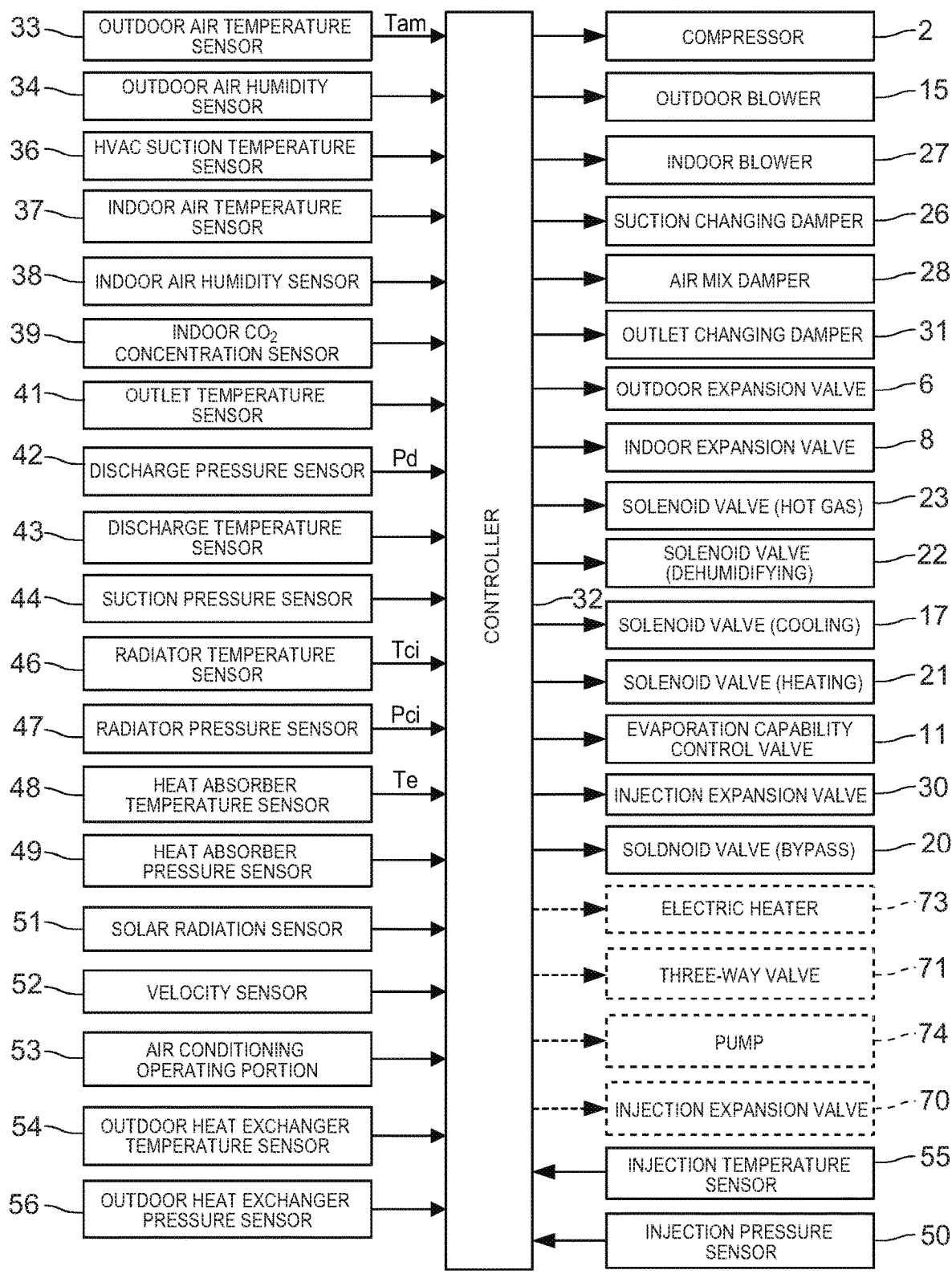
FIG. 2 is a block diagram of an electric circuit of a controller of the vehicle air conditioner of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air in the vehicle interior (the indoor air), an indoor air humidity sensor 38 which detects a humidity of the air in the vehicle interior, an indoor air $CO_2$ concentration sensor 39 which detects a carbon dioxide concentration in the vehicle interior, an outlet temperature sensor 41 which detects a temperature of the air blown out from the outlet 29 into the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor which detects a temperature of the radiator 4 (the temperature of the refrigerant which has just flowed out from the radiator 4 or the temperature of the radiator 4 itself or the temperature of the air which has just been heated in the radiator 4), a radiator pressure sensor 47 which detects a refrigerant pressure of the radiator 4 (the pressure in the radiator 4 or the pressure of the refrigerant which has just flowed out from the radiator 4), a heat absorber temperature sensor 48 which detects a temperature of the heat absorber 9 (the temperature of the refrigerant which has just flowed out from the heat absorber 9 or the temperature of the heat absorber 9 itself or the temperature of the air which has just been cooled in the heat absorber 9), a heat absorber pressure sensor 49 which detects a refrigerant pressure of the heat absorber 9 (the pressure in the heat absorber 9 or the pressure of the refrigerant which has just flowed out from the heat absorber 9), a solar radiation sensor 51 of, e.g., a photo sensor system to detect a solar radiation amount into the vehicle, a velocity sensor 52 to detect a moving speed of the vehicle (a velocity), an air conditioning operating portion 53 to set the changing of the predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure of the refrigerant in the outdoor heat exchanger 7 or the refrigerant which has just flowed out from the outdoor heat exchanger 7).

Additionally, the input of the controller 32 is further connected to respective outputs of an injection pressure sensor 50 which detects a pressure of an injection refrigerant flowing into the refrigerant pipe 13K of the injection circuit 40 and flowing through the discharge side heat exchanger 35 to return to the middle of the compression by the compressor 2, and an injection temperature sensor 55 which detects a temperature of the injection refrigerant.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 23, 22, 17, 21 and 20, the injection expansion valve 30, and the evaporation capability control valve 11. Further, the controller 32 controls these components on the basis of the outputs of the respective sensors and the setting input by the air conditioning operating portion 53.

Next, an operation of the vehicle air conditioner 1 of the embodiment having the abovementioned constitution will be described. The controller 32 changes and executes respective roughly divided operation modes such as a heating mode, a dehumidifying and heating mode, an internal cycle mode, a dehumidifying and cooling mode, and a cooling mode. First, the flow of the refrigerant in each operation mode will be described.

(1) Flow of Refrigerant of Heating Mode

When the heating mode is selected by the controller 32 or a manual operation to the air conditioning operating portion 53, the controller 32 opens the solenoid valve 21 and closes the solenoid valve 17, the solenoid valve 22, the solenoid valve 20 and the solenoid valve 23. Further, the compressor 2 and the respective blowers 15 and 27 are operated, and the air mix damper 28 has a state where the air blown out from the indoor blower 27 is passed through the radiator 4. In consequence, a high-temperature high-pressure gas refrigerant discharged from the compressor 2 flows through the discharge side heat exchanger 35 and then flows into the radiator 4. The air in the air flow passage 3 is passed through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then a part of the refrigerant is distributed to the refrigerant pipe 13K of the injection circuit 40, and mainly flows through the refrigerant pipe 13E to reach the outdoor expansion valve 6. It is to be noted that a function and an operation of the injection circuit 40 will be described later. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15 (heat pump). Further, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29, and hence the heating in the vehicle interior is performed.

In the embodiment, the controller 32 controls a number of revolution of the compressor 2 on the basis of a high pressure of the refrigerant circuit R which is detected by the radiator pressure sensor 47 (or the discharge pressure sensor 42), also controls a valve position of the outdoor expansion valve 6 on the basis of an after-mentioned target outlet temperature, the temperature of the radiator 4 which is detected by the radiator temperature sensor 46, and the refrigerant pressure of the radiator 4 which is detected by the radiator pressure sensor 47, and controls a subcool degree of the refrigerant in the outlet of the radiator 4.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating in the vehicle interior are performed.

The controller 32 controls the number of revolution of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48. It is to be noted that in this dehumidifying and heating mode, the gas injection by the injection circuit 40 is not performed, and hence the injection expansion valve 30 is shut off (a shut off position).

(3) Flow of Refrigerant of Internal Cycle Mode

Next, in the internal cycle mode, the controller 32 shuts off the outdoor expansion valve 6 in the above state of the dehumidifying and heating mode (a shut off position), and also closes the solenoid valve 21. The outdoor expansion valve 6 and the solenoid valve 21 are closed, whereby inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Further, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, and hence the dehumidifying and heating in the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability lowers.

The controller 32 controls the number of revolution of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2. It is to be noted that also in this internal cycle mode, the gas injection by the injection circuit 40 is not performed, and hence the injection expansion valve 30 is shut off (the shut off position).

(4) Flow of Refrigerant of Dehumidifying and Cooling Mode

Next, in the dehumidifying and cooling mode, the controller 32 opens the solenoid valve 17 and closes the solenoid valve 21, the solenoid valve 22, the solenoid valve 20 and the solenoid valve 23. Further, the compressor 2 and the respective blowers 15 and 27 are operated, and the air mix damper 28 has the state where the air blown out from the indoor blower 27 is passed through the radiator 4. In consequence, the high-temperature high-pressure gas refrigerant discharged from the compressor 2 flows into the radiator 4 through the discharge side heat exchanger 35. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), and hence the dehumidifying and cooling in the vehicle interior are performed.

The controller 32 controls the number of revolution of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R, and controls a refrigerant pressure (a radiator pressure Pci) of the radiator 4. It is to be noted that also in this dehumidifying and cooling mode, the gas injection by the injection circuit 40 is not performed, and hence the injection expansion valve 30 is shut off (the shut off position).

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including a fully open position (the valve position is set to an upper limit of controlling)), and the air mix damper 28 has a state where the air is not passed through the radiator 4. In consequence, the high-temperature high-pressure gas refrigerant discharged from the compressor 2 flows into the radiator 4 through the discharge side heat exchanger 35. The air in the air flow passage 3 is not passed through the radiator 4, the refrigerant therefore only passes here, and the refrigerant flowing out from the radiator 4 flows through the refrigerant pipe 13E to reach the solenoid valve 20 and the outdoor expansion valve 6.

At this time, the solenoid valve 20 is opened and hence the refrigerant bypasses the outdoor expansion valve 6 to pass the bypass pipe 13J, and flows into the outdoor heat exchanger 7 as it is, in which the refrigerant is cooled by the running therein or the outdoor air passed through the outdoor blower 15, to condensate and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 into the vehicle interior, and hence cooling in the vehicle interior is performed. In this cooling mode, the controller 32 controls the number of revolution of the compressor 2 on the basis of the temperature of the heat absorber 9 which is detected by the heat absorber temperature sensor 48. It is to be noted that also in this cooling mode, the gas injection by the injection circuit 40 is not performed, and hence the injection expansion valve 30 is shut off (the shut off position).

(6) Gas Injection in Heating Mode

Figure 3:
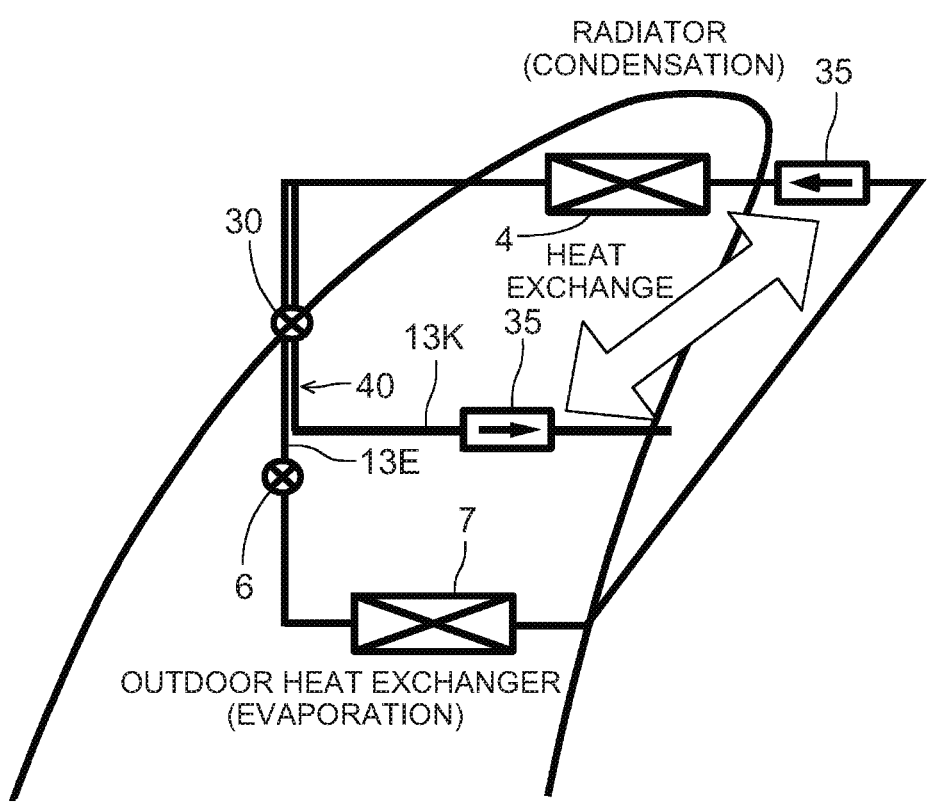
FIG. 3 is a p-h diagram of the vehicle air conditioner of FIG. 1.

Next, the gas injection in the above heating mode will be described. FIG. 3 shows a P-h diagram of the vehicle air conditioner 1 of the present invention in the heating mode. The refrigerant flowing out from the radiator 4 to enter the refrigerant pipe 13E and then distributed to flow into the refrigerant pipe 13K of the injection circuit 40 is decompressed by the injection expansion valve 30, enters the discharge side heat exchanger 35 to perform therein the heat exchange with the discharged refrigerant of the compressor 2 (the refrigerant discharged from the compressor 2 before flowing into the radiator 4), and then absorbs heat to evaporate. Afterward, the evaporated gas refrigerant returns to the middle of the compression by the compressor 2, is further compressed together with the refrigerant sucked from the accumulator 12 to be compressed, and then discharged from the compressor 2 to the refrigerant pipe 13G again.

In FIG. 3, a line denoted with 35 indicates the refrigerant returned to the compressor 2 by the injection circuit 40. The refrigerant is returned from the injection circuit 40 to the middle of the compression by the compressor 2, the amount of the refrigerant to be discharged from the compressor 2 increases, and hence the heating capability in the radiator 4 improves. However, when a liquid refrigerant returns to the compressor 2, liquid compression is caused, and hence the refrigerant to be returned from the injection circuit 40 to the compressor 2 has to be a gas.

Therefore, the controller 32 monitors a superheat degree of the refrigerant flowing toward the middle of the compression by the compressor 2, from the pressure and temperature of the refrigerant after the discharge side heat exchanger 35 which are detected by the injection pressure sensor 50 and the injection temperature sensor 55, respectively, and the controller controls the valve position of the injection expansion valve 30 so that a predetermined superheat degree is attached in the heat exchange with the discharged refrigerant. However, in the embodiment, the heat exchange between the remarkably high-temperature refrigerant discharged from the compressor 2 before flowing into the radiator 4 and the refrigerant flowing through the injection circuit 40 is performed in the discharge side heat exchanger 35, and hence a large heat exchange amount can be obtained. Therefore, even when the valve position of the injection expansion valve 30 is enlarged to increase an injection amount, the refrigerant can sufficiently evaporate in the discharge side heat exchanger 35, and a necessary superheat degree can be obtained.

In consequence, a gas injection amount to the compressor 2 can sufficiently be acquired and the amount of the refrigerant to be discharged from the compressor 2 can be increased to improve the heating capability, as compared with a case where the heat exchange between the refrigerant after the radiator and the injection refrigerant is performed as in a conventional technology.

(7) Control of Compressor, Outdoor Expansion Valve and Injection Expansion Valve in Heating Mode During Vehicle Running Next, there will be described control of the compressor 2 and the outdoor expansion valve 6 in the heating mode during the running of the vehicle (the electric car), and the injection expansion valve 30 of the injection circuit 40 in the heating mode (gas injection).

Figure 4:
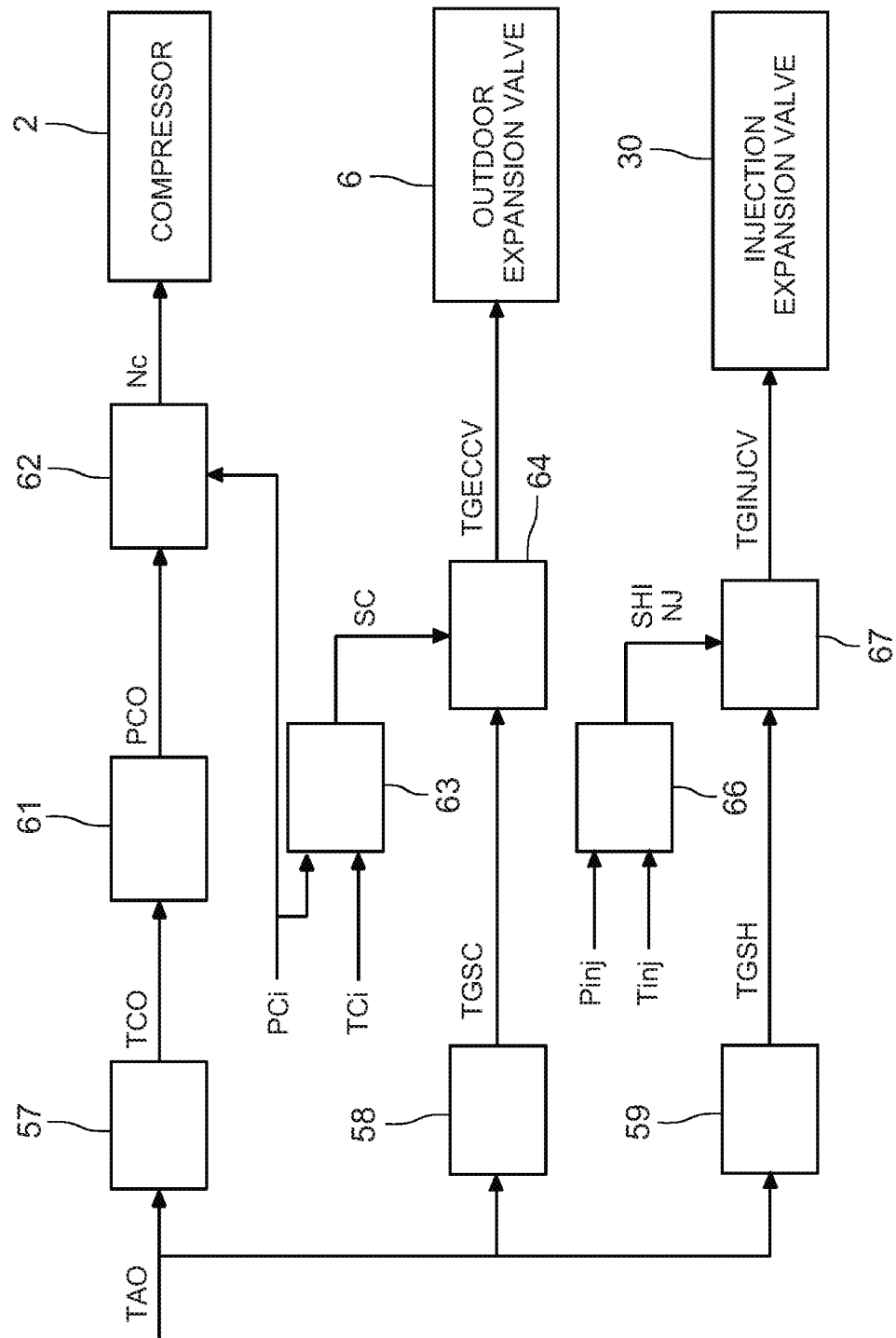
FIG. 4 is a control block diagram of the controller of FIG. 2.
Figure 5:
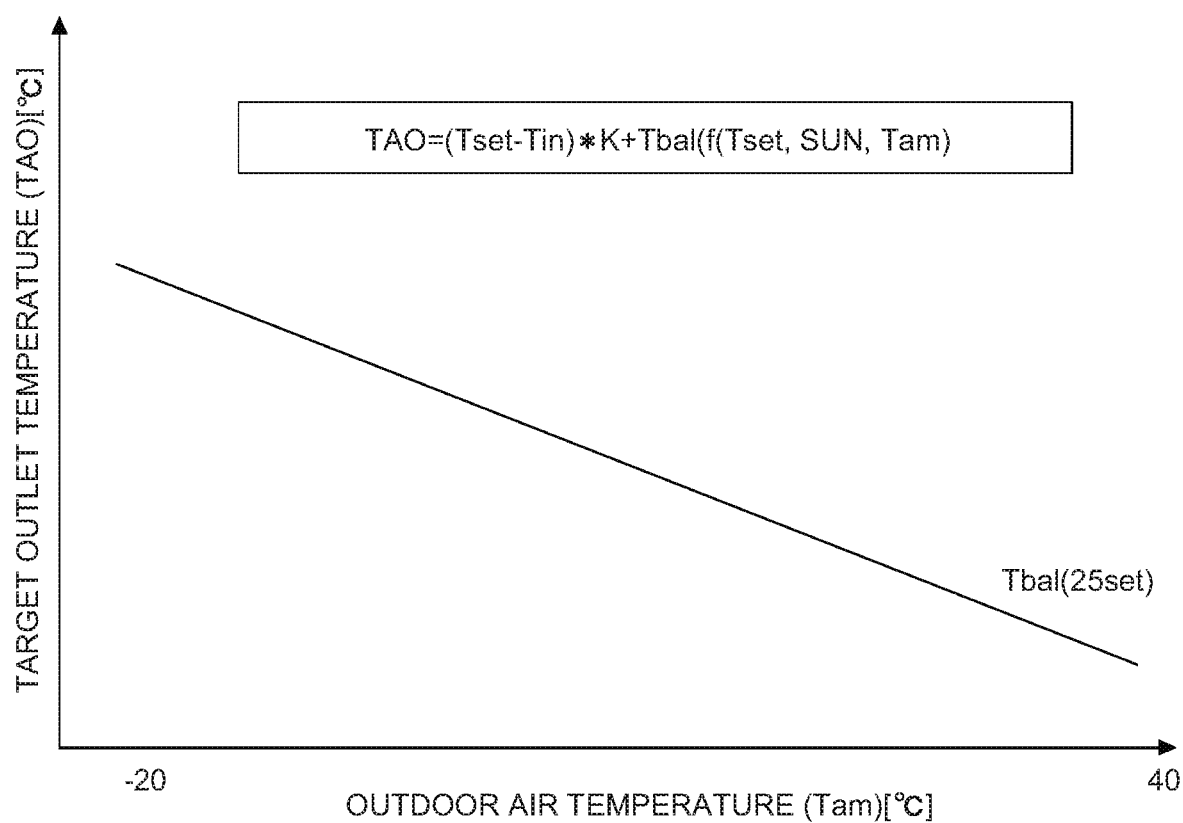
FIG. 5 is a diagram to explain determination of a target outlet temperature by the controller of FIG. 2.

FIG. 4 shows a control block diagram of the compressor 2, the outdoor expansion valve 6 and the injection expansion valve 30 by the controller 32 in the above heating mode. The controller 32 inputs a target outlet temperature TAO into a target radiator temperature calculation section 57, a target radiator subcool degree calculation section 58 and a target injection refrigerant superheat degree calculation section 59. The target outlet temperature TAO is a target value of a temperature of air blown out from the outlet 29 into the vehicle interior, and calculated from Equation (I) mentioned below by the controller 32.

$$TAO=(Tset-Tin) \times K+Tbal(f(Tset,SUN,Tam)) \qquad (I),$$

in which Tset is a predetermined temperature in the vehicle interior which is set by the air conditioning operating portion 53, Tin is a temperature of the air in the vehicle interior which is detected by the indoor air temperature sensor 37, K is a coefficient, and Tbal is a balance value calculated from the predetermined temperature Tset, a solar radiation amount SUN detected by the solar radiation sensor 51, and an outdoor air temperature Tam detected by the outdoor air temperature sensor 33. Further, in general, the lower the outdoor air temperature Tam is, the higher the target outlet temperature TAO becomes, and the higher the outdoor air temperature Tam is, the lower the target outlet temperature becomes as shown in FIG. 5.

The target radiator temperature calculation section 57 of the controller 32 calculates a target radiator temperature TCO from the target outlet temperature TAO, and next a target radiator pressure calculation section 61 of the controller 32 calculates a target radiator pressure PCO on the basis of the target radiator temperature TCO. Further, on the basis of the target radiator pressure PCO and the pressure (the radiator pressure) Pci of the radiator 4 which is detected by the radiator pressure sensor 47, a compressor revolution number calculation section 62 of the controller 32 calculates a number of revolution Nc of the compressor 2, and operates the compressor 2 at the number of revolution Nc. That is, the controller 32 controls the pressure Pci of the radiator 4 in accordance with the number of revolution Nc of the compressor 2.

Additionally, the target radiator subcool degree calculation section 58 of the controller 32 calculates a target radiator subcool degree TGSC of the radiator 4 on the basis of the target outlet temperature TAO. On the other hand, a radiator subcool degree calculation section 63 of the controller 32 calculates the subcool degree (a radiator subcool degree SC) of the refrigerant in the radiator 4 on the basis of the radiator pressure Pci and a temperature (a radiator temperature Tci) of the radiator 4 which is detected by the radiator temperature sensor 46. Further, on the basis of the radiator subcool degree SC and the target radiator subcool degree TGSC, a target outdoor expansion valve position calculation section 64 calculates a target valve position (a target outdoor expansion valve position TGECCV) of the outdoor expansion valve 6. Further, the controller 32 controls the valve position of the outdoor expansion valve 6 into the target outdoor expansion valve position TGECCV.

The radiator subcool degree calculation section 63 of the controller 32 performs the calculation in such a direction as to raise the target radiator subcool degree TGSC, when the target outlet temperature TAO becomes higher, but the present invention is not limited to this embodiment, and the section may perform the calculation on the basis of an after-mentioned difference (a capability difference) between a requested heating capability Qtgt and a heating capability Qmaxhp, the radiator pressure Pci, or a difference (a pressure difference) between the target radiator pressure PCO and the radiator pressure Pci. In this case, the controller 32 lowers the target radiator subcool degree TGSC, when the capability difference becomes smaller, the pressure difference becomes smaller, an air volume of the indoor blower 27 becomes smaller or the radiator pressure Pci becomes smaller.

Furthermore, the target injection refrigerant superheat degree calculation section 59 of the controller 32 calculates a target value of the superheat degree of the injection refrigerant to be returned from the injection circuit 40 to the middle of the compression by the compressor (a target injection refrigerant superheat degree TGSH) on the basis of the target outlet temperature TAO. On the other hand, an injection refrigerant superheat degree calculation section 66 of the controller 32 calculates a superheat degree INJSH of the injection refrigerant on the basis of a pressure of the injection refrigerant (an injection refrigerant pressure Pinj) which is detected by the injection pressure sensor 50 and a temperature of the injection refrigerant (an injection refrigerant temperature Tinj) which is detected by the injection temperature sensor 55.

Further, a target injection expansion valve position calculation section 67 calculates a target valve position of the injection expansion valve 30 (a target injection expansion valve position TGINJCV) on the basis of the injection refrigerant superheat degree INJSH and the target injection refrigerant superheat degree TGSH. Further, the controller 32 controls the valve position of the injection expansion valve 30 into the target injection expansion valve position TGINJCV.

The target injection refrigerant superheat degree calculation section 59 lowers the target injection refrigerant superheat degree TGSH, for example, when the target outlet temperature TAO becomes higher (a hysteresis is present).

When the target injection refrigerant superheat degree TGSH is lowered, the valve position of the injection expansion valve 30 is enlarged to increase the injection amount. That is, when the target outlet temperature TAO becomes higher, the controller 32 increases the injection amount to be returned to the compressor 2 by the injection expansion valve 30, so that the amount of the refrigerant to be discharged from the compressor 2 is increased to enhance the heating capability.

Additionally, the controller 32 calculates the requested heating capability Qtgt as the heating capability of the radiator 4 which is requested, and the heating capability Qmaxhp (i.e., a limit value of the heating capability, an estimated value) which is the maximum heating capability generable by the radiator 4 when the refrigerant is not passed through the injection circuit 40, i.e., when the gas injection is not performed, by use of Equation (II) and Equation (III).

$$Qtgt=(TCO-Te) \times Cpa \times \rho \times Qair \quad (II)$$

$$Qmaxhp=f(Tam,Nc,BLV,VSP,Te) \quad (III)$$

Here, Te is the temperature of the heat absorber 9 which is detected by the heat absorber temperature sensor 48, Cpa is specific heat [kj/kg·K] of the air flowing into the radiator 4, $\rho$ is a density (a specific volume) [kg/m$^3$] of the air flowing into the radiator 4, Qair is a volume [m$^3$/h] of the air passing the radiator 4 (estimated from a blower voltage BLV of the indoor blower 27 or the like), and VSP is a velocity which can be obtained from the velocity sensor 52.

It is to be noted that in Equation (II), the temperature of the air flowing into the radiator 4 or the temperature of the air flowing out from the radiator 4 may be employed in place of or in addition to TCO or Te. Additionally, the number of revolution Nc of the compressor 2 of Equation (III) is one example of an index indicating a refrigerant flow rate, the blower voltage BLV is one example of an index indicating the air volume in the air flow passage 3, and the heating capability Qmaxhp is calculated from these functions. In addition, Qmaxhp may be calculated from one of these functions, an outlet refrigerant pressure of the radiator 4, an outlet refrigerant temperature of the radiator 4, an inlet refrigerant pressure of the radiator 4 and an inlet refrigerant temperature of the radiator 4, or any combination thereof.

Further, when the requested heating capability Qtgt is the heating capability Qmaxhp or less, the controller 32 executes control without injection. In this case, the controller 32 shuts off the injection expansion valve 30 (the shut off position), and does not pass the refrigerant through the injection circuit 40. On the other hand, when the requested heating capability Qtgt is in excess of the heating capability Qmaxhp, i.e., when the heating capability Qmaxhp by the radiator 4 runs short to the requested heating capability Qtgt, the control with the injection is performed, and the gas injection is executed. In this case, the controller 32 defines the valve position of the injection expansion valve 30 as a predetermined value to open the valve, and performs the gas injection to the compressor 2. That is, as described above, the controller 32 controls the valve position of the injection expansion valve 30 into the target injection expansion valve position TGINJCV.

(8) Preliminary Air Conditioning During Plug-in (Heating Mode)

Next, there will be described control of a heating medium circulating circuit and the refrigerant circuit R when the above heating mode is defined during the plug-in of the vehicle (the electric car) and the vehicle interior is preliminarily air-conditioned (heated), with reference to FIG. 6 and FIG. 7.

The controller 32 can execute the heating mode also during the plug-in in which the vehicle is connected to the external power source and the battery is charged. In this case, in step S1 of FIG. 6, the controller 32 judges whether or not the vehicle is plugged in at present and whether or not there is a heating request by a user (an input operation to start the heating mode). First, in a case where the vehicle is not plugged in or a case where there is no heating request, the controller advances from the step S1 to step S12 to judge whether or not the outdoor heat exchanger 7 is frosted, and in a case where the outdoor heat exchanger is not frosted, the controller stops the operation of the vehicle air conditioner 1 in step S13. Additionally, in a case where the outdoor heat exchanger 7 is frosted, the controller advances to step S14, thereby shifting to the defrosting mode to execute a defrosting operation of the outdoor heat exchanger 7. It is to be noted that the frosting judgment of the outdoor heat exchanger 7 in the step S12 and the defrosting mode in the step S14 will be described later in detail.

On the other hand, in a case where the vehicle is plugged in at present and there is the heating request by the user, the controller 32 advances from the step S1 to step S2, reads data from each sensor, and judges whether or not the outdoor heat exchanger 7 is frosted, in step S3 in the same manner as in the step S12. During running before the vehicle is plugged in, water in the outdoor air adheres as frost to the outdoor heat exchanger 7 in the heating mode. When this frost grows, heat exchange between the outdoor heat exchanger 7 and the outdoor air to be passed is remarkably obstructed, and an air conditioning performance deteriorates.

(8-1) Frosting Judgment of Outdoor Heat Exchanger

In the step S3 (similarly to the step S12), the controller 32 judges (estimates) a frosting state to the outdoor heat exchanger 7 by frosting estimation means as its function. Next, a judgment example of the frosting state of the outdoor heat exchanger 7 will be described.

The controller 32 judges the frosting state of the outdoor heat exchanger 7 on the basis of a present refrigerant evaporation temperature TXO of the outdoor heat exchanger 7 which can be obtained from the outdoor heat exchanger pressure sensor 56 and a refrigerant evaporation temperature TXObase of the outdoor heat exchanger 7 in non-frosting when the outdoor air has a low humidity environment and the outdoor heat exchanger 7 is not frosted. In this case, the controller 32 determines the refrigerant evaporation temperature TXObase of the outdoor heat exchanger 7 in the non-frosting by use of Equation (IV) mentioned below.

$$TXObase=f(Tam,NC,BLV,VSP)=k1 \times Tam+k2 \times NC+k3 \times BLV+k4 \times VSP \quad (IV),$$

in which Tam which is a parameter of Equation (IV) is the above outdoor air temperature which can be obtained from the outdoor air temperature sensor 33, NC is the number of revolution of the compressor 2, BLV is a blower voltage of the indoor blower 27, VSP is a velocity which can be obtained from the velocity sensor 52, and k1 to k4 are coefficients which are beforehand obtained by experiments.

The outdoor air temperature Tam is an index indicating a suction air temperature of the outdoor heat exchanger 7, and when the outdoor air temperature Tam (the suction air temperature of the outdoor heat exchanger 7) becomes lower, TXObase tends to be lower. Therefore, the coefficient k1 is a positive value. It is to be noted that the index indicating the suction air temperature of the outdoor heat exchanger 7 is not limited to the outdoor air temperature Tam.

Additionally, the number of revolution NC of the compressor 2 is an index indicating a refrigerant flow rate in the refrigerant circuit R, and when the number of revolution NC is higher (the refrigerant flow rate is larger), TXObase tends to be lower. Therefore, the coefficient k2 is a negative value.

Additionally, the blower voltage BLV is an index indicating the volume of the air to be passed through the radiator 4, and when the blower voltage BLV is higher (the volume of the air to be passed through the radiator 4 is larger), TXObase tends to be lower. Therefore, the coefficient k3 is a negative value. It is to be noted that the index indicating the volume of the air to be passed through the radiator 4 is not limited to this index, and may be a blower air volume of the indoor blower 27 or an opening SW of the air mix damper 28.

Additionally, the velocity VSP is an index indicating the velocity of the air to be passed through the outdoor heat exchanger 7, and when the velocity VSP is lower (the velocity of the air to be passed through the outdoor heat exchanger 7 is lower), TXObase tends to be lower. Therefore, the coefficient k4 is a positive value.

It is to be noted that during the plug-in, the velocity VSP is 0, and hence, in this case, an outdoor fan voltage FANVout of the outdoor blower 15 is substituted as the index indicating the velocity of the air to be passed through the outdoor heat exchanger 7. Additionally, in the embodiment, as the parameters of Equation (IV), the outdoor air temperature Tam, the number of revolution NC of the compressor 2, the blower voltage BLV of the indoor blower 27 and the velocity VSP are used, but a load of the vehicle air conditioner 1 may be added as another parameter to these parameters. It is considered that indexes indicating this load are the target outlet temperature TAO, the number of revolution NC of the compressor 2, the blower air volume of the indoor blower 27, an inlet air temperature of the radiator 4 and the radiator temperature Tci of the radiator 4, and when the load is larger, TXObase tends to be lower. Furthermore, aging deterioration (the number of years of operation or the number of times of operation) of the vehicle may be added to the parameters. Additionally, the parameters of Equation (IV) are not limited to all of the above parameters, and one of the parameters or any combination thereof may be used.

Next, the controller 32 calculates a difference $\Delta$TXO ($\Delta$TXO=TXObase−TXO) between the refrigerant evaporation temperature TXObase in non-frosting which can be obtained by substituting a present value of each parameter into Equation (IV) and the present refrigerant evaporation temperature TXO, and the controller judges that the outdoor heat exchanger 7 is frosted when there continues, for predetermined frosting state estimation time, a state where the refrigerant evaporation temperature TXO is lower than the refrigerant evaporation temperature TXObase in non-frosting and the difference $\Delta$TXO is larger than a predetermined frosting detection threshold value $\Delta$T1 ($\Delta$TXO>$\Delta$T1).

(8-2) Defrosting Mode of Outdoor Heat Exchanger

In a case where the outdoor heat exchanger 7 is frosted in the step S3 (similarly to the step S12), the controller advances to step S6 (similarly to the step S14) to execute the defrosting mode. In the defrosting mode of the step S6 (the step S14), the controller 32 opens the solenoid valve 23 and the solenoid valve 21, and closes the solenoid valve 22 and the solenoid valve 17. Further, the defrosting operation is performed to operate the compressor 2 by the power from the external power source or the power from the battery charged by the external power source. In consequence, the high-temperature high-pressure gas refrigerant (a hot gas) discharged from the compressor 2 flows through the solenoid valve 23 and the refrigerant pipe 13H, and directly flows into the outdoor heat exchanger 7 from the refrigerant pipe 13I through the check valve 24. Consequently, the outdoor heat exchanger 7 is heated, and hence, the frost is molten and removed.

The refrigerant flowing out from the outdoor heat exchanger 7 flows from the refrigerant pipe 13A through the solenoid valve 21 to enter the refrigerant pipe 13D, and flows through the refrigerant pipe 13B to be sucked into the compressor 2. Further, in a case where predetermined time elapses from the start of the defrosting mode, the controller 32 ends the defrosting mode to return to the step S1, and is reset to the heating mode.

(8-3) Frosting Prediction of Outdoor Heat Exchanger

On the other hand, in a case where it is judged in the step S3 that the difference $\Delta$TXO is the frosting detection threshold value $\Delta$T1 or less ($\Delta$TXO≤$\Delta$T1) and that the outdoor heat exchanger 7 is not frosted, the controller 32 advances to step S4 to judge whether or not it is predicted that the outdoor heat exchanger 7 is frosted this time. FIG. 7 shows one example of a flowchart of the frosting prediction in the step S4.

Figure 7:
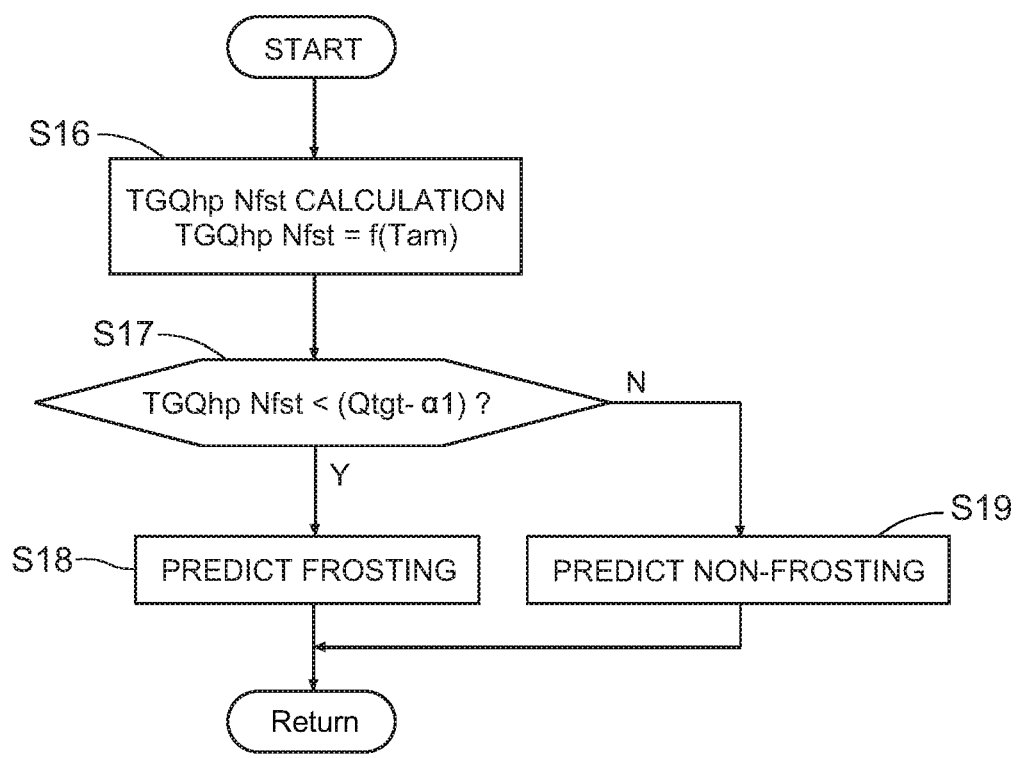
FIG. 7 is a flowchart of frosting prediction of the controller of FIG. 2 when a frost point cannot be detected.

First in step S16 of FIG. 7, the controller 32 predicts and calculates a maximum heating capability predicted value without frosting TGQhpNfst which is a target value of the maximum heating capability generable by the radiator 4 in a range in which the outdoor heat exchanger 7 is not frosted, i.e., a target value of the maximum heating capability generable by the radiator 4 without frosting the outdoor heat exchanger 7 in a case where a heat pump operation is performed to let the refrigerant radiate heat in the radiator 4 and evaporate the refrigerant in the outdoor heat exchanger 7 under an environment where the vehicle is placed at present, by use of Equation (V) mentioned below.

$$TGQhpNfst=f(Tam) \quad (V),$$

in which Tam is the abovementioned outdoor air temperature detected by the outdoor air temperature sensor 33. It is to be noted that the maximum heating capability predicted value without frosting TGQhpNfst may be corrected with reference to respective environmental conditions or external information such as time, a solar radiation amount detected by the solar radiation sensor 51, a rainfall, a location and a meteorological phenomenon, in addition to the outdoor air temperature Tam in Equation (V).

Figure 8:
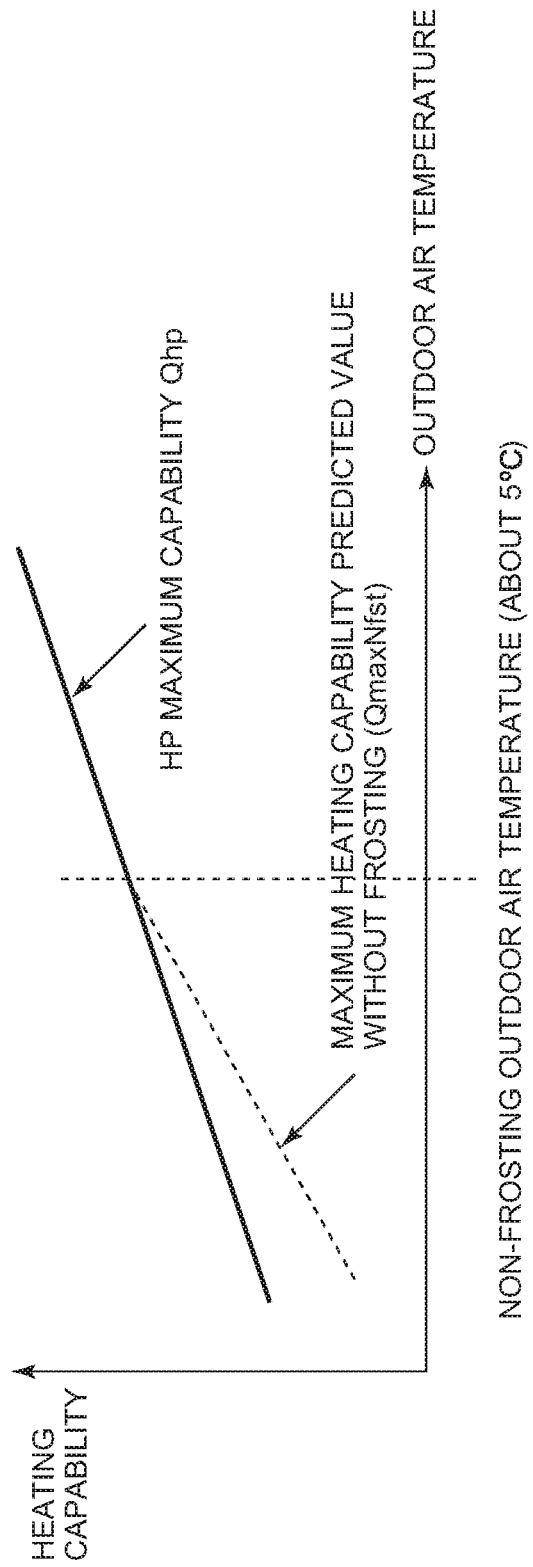
FIG. 8 is a diagram showing a relation between a maximum heating capability predicted value without frosting of a radiator at which an outdoor heat exchanger of FIG. 1 is not frosted and an outdoor air temperature.

FIG. 8 shows a relation between the maximum heating capability predicted value without frosting TGQhpNfst and the outdoor air temperature (a tendency of a change of the maximum heating capability predicted value without frosting). The heating capability Qmaxhp generable by the radiator 4 increases in proportion to a rise of the outdoor air temperature Tam. Further, when the outdoor air temperature at which the outdoor heat exchanger 7 is not frosted is about +5° C. and when the vehicle air conditioner is operated with the maximum heating capability Qmaxhp as it is at +5° C. or less, the outdoor heat exchanger 7 is frosted, and hence, as shown by a broken line in FIG. 8, there is a tendency that the maximum heating capability predicted value without frosting TGQhpNfst decreases at a larger angle than the maximum heating capability Qmaxhp, with drop of the outdoor air temperature.

The controller 32 calculates the maximum heating capability predicted value without frosting TGQhpNfst in the step S16 by use of Equation (V) mentioned above, and then calculates the requested heating capability Qtgt by (II) mentioned above, and in step S17, the controller judges whether or not the maximum heating capability predicted value without frosting TGQhpNfst is smaller than the requested heating capability Qtgt−α1 (TGQhpNfst<(Qtgt−α1)). This α1 is a value to impart a margin to the frosting, and Qtgt−α1 is smaller than the requested heating capability Qtgt but is close thereto. It is to be noted that in a case where the margin is not required, α1=0 is defined and the judgment in the step S17 may be performed with TGQhpNfst<Qtgt.

Further, in a case where the maximum heating capability predicted value without frosting TGQhpNfst is smaller than the close value (Qtgt−α1) to the requested heating capability in this embodiment, the controller advances to step S18 to predict that the outdoor heat exchanger 7 is frosted, when the heating is performed in the radiator 4 by the operation of the compressor 2. It is to be noted that in the case of TGQhpNfst≥(Qtgt−α1), the controller advances to step S19 to predict that the outdoor heat exchanger is not frosted.

Returning to FIG. 6, in a case where the controller 32 predicts in the step S18 that the outdoor heat exchanger is frosted, the controller advances from the step S4 to step S5 in which the controller suppresses the number of revolution of the compressor 2 to a predetermined value B or less, sets a voltage of the outdoor blower 15 to a predetermined value C or less to decrease a volume of the air to be passed through the outdoor heat exchanger 7, raises the target radiator subcool degree TGSC to a predetermined value D or more, and sets the blower voltage BLV of the indoor blower 27 to a predetermined value E or less to decrease a volume of the air to be passed through the air flow passage 3.

Due to the decrease of the number of revolution of the compressor 2, an amount of the refrigerant to be circulated through the outdoor heat exchanger 7 decreases. Additionally, due to the decrease of the volume of the air to be passed by the outdoor blower 15, a heat exchange amount with the outdoor air decreases. Consequently, a quantity of heat to be absorbed by the refrigerant in the outdoor heat exchanger 7 is suppressed. In consequence, the frosting to the outdoor heat exchanger 7 is prevented or inhibited. Additionally, with the rise of the target radiator subcool degree TGSC, the subcool degree of the refrigerant in the radiator 4 rises, the volume of the air to be passed through the radiator 4 in the air flow passage 3 decreases, and hence, a high pressure side pressure of the refrigerant circuit R rises. In consequence, maintaining of the heating capability in the radiator 4 can be achieved. It is to be noted that in the embodiment, there are performed in the step S5 all of setting of the voltage of the outdoor blower 15 to the predetermined value C or less, raising of the target radiator subcool degree TGSC to the predetermined value D or more and setting of the blower voltage BLV of the indoor blower 27 to the predetermined value E or less, but one or any combination of them may be executed.

Furthermore, a target valve position of the injection expansion valve 30 (the target injection expansion valve position TGINJCV) is set to an upper limit of controlling to maximize a gas injection amount to the middle of the compression by the compressor 2. Consequently, the amount of the refrigerant to be discharged from the compressor 2 increases to improve the heating capability in the radiator 4. It is to be noted that this upper limit of controlling is calculated from a minimum superheat degree target value (the target injection refrigerant superheat degree TGSH) at which the injection refrigerant to be returned from the injection circuit 40 to the middle of the compression by the compressor 2 does not cause a liquid back.

Figure 6:
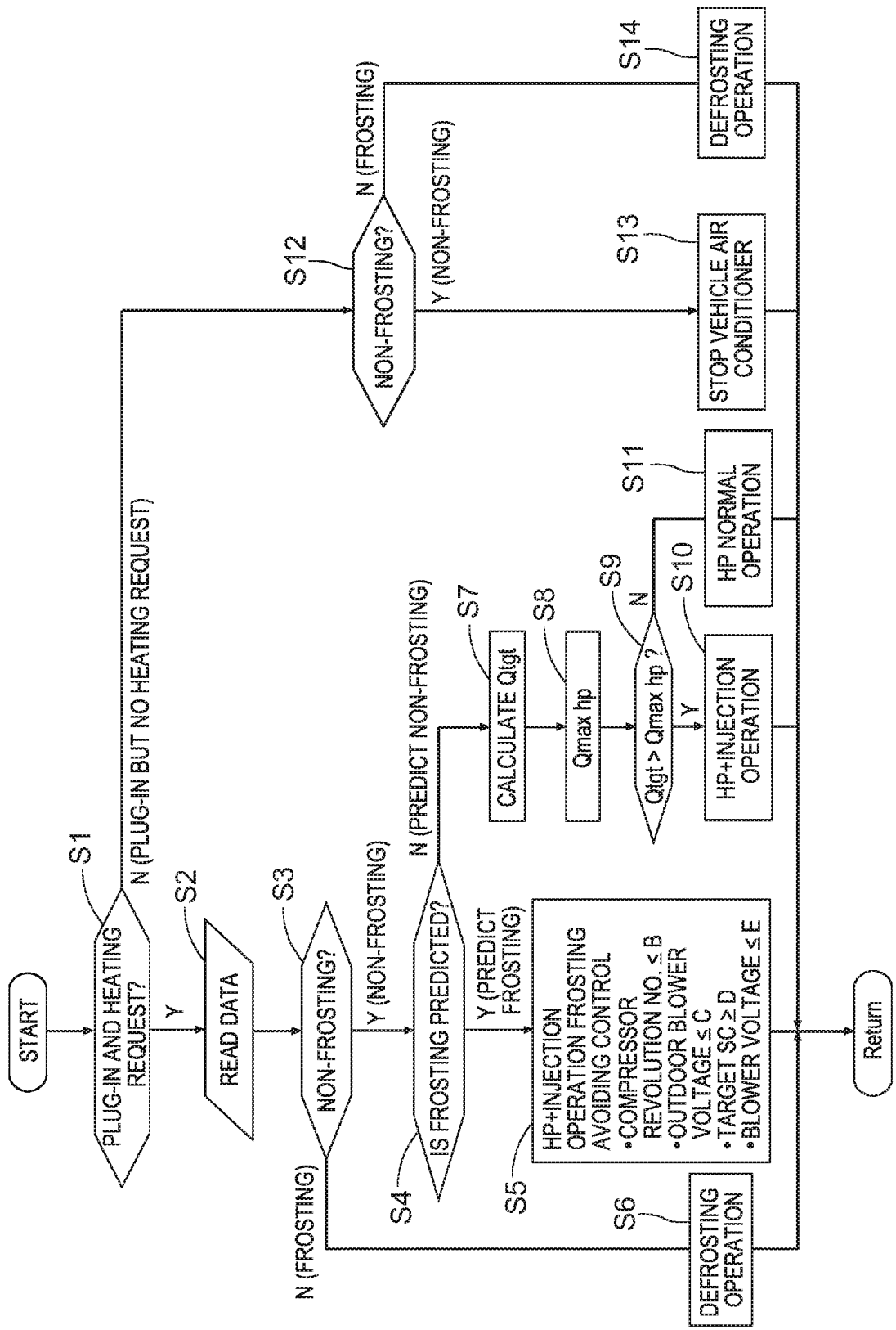
FIG. 6 is a flowchart to explain an operation of the controller of FIG. 2.

Additionally, in a case where it is predicted in the step S19 of FIG. 7 that the outdoor heat exchanger is not frosted, the controller 32 advances from the step S4 of FIG. 6 to step S7 to calculate the requested heating capability Qtgt by Equation (II) mentioned above again, and calculates the heating capability Qmaxhp by Equation (III) mentioned above in step S8. Next, in step S9, the controller 32 compares the requested heating capability Qtgt with the heating capability Qmaxhp. For example, in a case where the heating capability Qmaxhp runs short to the requested heating capability Qtgt in a cold season or the like (Qtgt>Qmaxhp), the controller advances to step S10 to execute the gas injection to the middle of the compression of the compressor 2 by the injection circuit 40 (HP+an injection operation). In consequence, the amount of the refrigerant to be discharged from the compressor 2 is increased to improve the heating capability.

On the other hand, in a case where the heating capability Qmaxhp satisfies (suffices) to the requested heating capability Qtgt (Qtgt≤Qmaxhp) in the step S9, the controller 32 advances to step S11 to stop the gas injection to the middle of the compression of the compressor 2 by the injection circuit 40, and executes a usual heat pump operation (an HP normal operation).

In consequence, when the heating mode is executed in the plug-in state where the power is supplied from the external power source to the compressor 2 or to the battery which supplies the power to drive the compressor 2, the controller 32 operates the injection circuit 40, and executes the gas injection to return the refrigerant to the middle of the compression by the compressor 2, in a case where it is predicted that the outdoor heat exchanger 7 is frosted. Therefore, when the vehicle interior is beforehand heated (the preliminary air conditioning) during the so-called plug-in, the gas injection is performed by the injection circuit 40 in the middle of the compression by the compressor 2, and the amount of the refrigerant to be discharged from the compressor 2 is increased by the gas injection while suppressing the heat absorption in the outdoor heat exchanger to prevent or inhibit the frosting to the outdoor heat exchanger 7. Consequently, it is possible to acquire the heating capability in the vehicle interior by the radiator 4, and it is possible to decrease loads during the subsequent running.

In consequence, it is possible to extend a running distance of the electric car or the hybrid car while maintaining the vehicle interior after the start of running at a comfortable temperature.

Additionally, the controller 32 suppresses the number of revolution of the compressor 2 to the predetermined value B or less, and increases the gas injection amount by the injection circuit 40, in the case where the frosting to the outdoor heat exchanger 7 is predicted. Therefore, the quantity of the heat to be absorbed in the outdoor heat exchanger 7 can securely be suppressed, thereby making it possible to effectively prevent or inhibit the frosting.

Additionally, the controller 32 raises the subcool degree SC of the refrigerant in the radiator 4 and further, decreases the volume of the air to be passed through the air flow passage 3, in the case where the frosting to the outdoor heat exchanger 7 is predicted, so that a pressure rise on a high pressure side can be promoted. In consequence, it is possible to acquire the heating capability of the radiator 4 in a situation where the number of revolution of the compressor 2 decreases.

Additionally, the controller 32 decreases the volume of the air to be passed through the outdoor heat exchanger 7 by the outdoor blower 15, in the case where the frosting to the outdoor heat exchanger 7 is predicted. In consequence, a volume of outdoor air to the outdoor heat exchanger 7 can be suppressed, thereby making it possible to further effectively prevent or inhibit the frosting of the outdoor heat exchanger 7 due to coagulation of the water in the outdoor air.

Additionally, the controller 32 compares the requested heating capability Qtgt as the heating capability of the radiator 4 which is requested with the heating capability Qmaxhp generable by the radiator 4 in a case where it is predicted that the outdoor heat exchanger 7 is not frosted, and the controller 32 executes the gas injection by the injection circuit 40 in a case where the heating capability Qmaxhp runs shorter than the requested heating capability Qtgt. In consequence, the gas injection to the compressor 2 can suitably be controlled, and as in the embodiment, the heat exchange is performed between the refrigerant discharged from the compressor 2 before flowing into the radiator 4 and the refrigerant of the injection circuit 40 in the discharge side heat exchanger 35, and deterioration of an efficiency during evaporating the refrigerant of the injection circuit 40 can be inhibited.

Further, the controller 32 calculates the maximum heating capability predicted value without frosting TGQhpNfst which is the target value of the maximum heating capability generable by the radiator 4 in the range in which the outdoor heat exchanger 7 is not frosted, and it is predicted that the outdoor heat exchanger 7 is frosted in a case where the maximum heating capability predicted value without frosting TGQhpNfst is smaller than the requested heating capability Qtgt or the value close to the requested heating capability. In consequence, also in a case where a so-called frost point at which the outdoor heat exchanger 7 is frosted cannot be detected, it is possible to effectively prevent or inhibit the frosting to the outdoor heat exchanger 7 during the plug-in.

In this case, the controller 32 calculates the maximum heating capability predicted value without frosting TGQhpNfst on the basis of the outdoor air temperature Tam, or time, solar radiation, a rainfall, a location and weather conditions in addition to the outdoor air temperature. In consequence, the maximum heating capability predicted value without frosting TGQhpNfst at which the outdoor heat exchanger 7 is not frosted can precisely be estimated. That is, as a result, the frost point can precisely be estimated, thereby making it possible to further effectively prevent or inhibit the frosting to the outdoor heat exchanger 7 during the plug-in.

Additionally, in the embodiment, the injection circuit 40 is constituted of the injection expansion valve 30, and the discharge side heat exchanger 35 which performs the heat exchange between the refrigerant decompressed by the injection expansion valve 30 and the refrigerant discharged from the compressor 2 before flowing into the radiator 4, so that the refrigerant to be returned to the middle of the compression by the compressor 2 can be evaporated in the discharge side heat exchanger 35. Especially in this case, when the heat exchange is performed with the refrigerant discharged from the compressor 2 before flowing into the radiator 4, the refrigerant to be returned to the middle of the compression by the compressor 2 can be evaporated by a higher-temperature refrigerant, and hence, the gas injection amount can sufficiently be acquired and the increase of the amount of the refrigerant to be discharged from the compressor 2 can be achieved.

Embodiment 2

Figure 9:
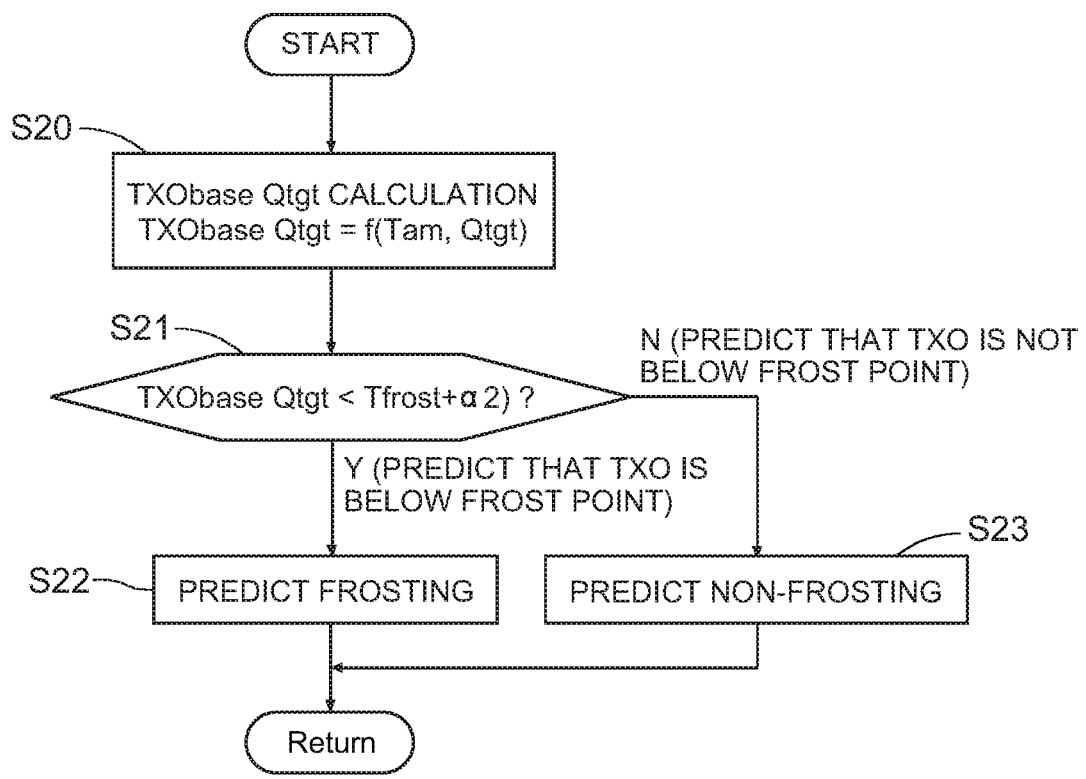
FIG. 9 is a flowchart of the frosting prediction of the controller of FIG. 2 when the frost point can be detected.

Next, FIG. 9 shows a flowchart of another embodiment of frosting prediction in the step S4 of FIG. 6 which is shown in FIG. 7. It is to be noted that another control is the same as in FIG. 1 to FIG. 8.

(8-4) Another Example of Frosting Prediction of Outdoor Heat Exchanger

In this case, first in step S20 of FIG. 9, a controller 32 predicts and calculates a requested refrigerant evaporation temperature in non-frosting TXObaseQtgt which is a refrigerant evaporation temperature of an outdoor heat exchanger 7 to achieve a requested heating capability Qtgt in non-frosting, i.e., when the outdoor heat exchanger 7 is not frosted, by use of Equation (VI) mentioned below.

$$TXObaseQtgt = f(Tam, Qtgt) \tag{VI}$$

in which Tam is the abovementioned outdoor air temperature detected by an outdoor air temperature sensor 33.

Additionally, in this embodiment, the controller 32 calculates a frost point Tfrost as a temperature of outdoor air around the outdoor heat exchanger 7 at which the outdoor heat exchanger 7 is frosted (a temperature at which a steam pressure in the outdoor air equals a saturated steam pressure of ice) from the outdoor air temperature Tam of a vehicle which is detected by the outdoor air temperature sensor 33 and an outdoor air humidity of the vehicle which is detected by an outdoor air humidity sensor 34. A calculating method of the frost point Tfrost is usual, and hence, the description thereof is omitted.

Further, it is judged in step S21 whether or not the requested refrigerant evaporation temperature in non-frosting TXObaseQtgt is smaller than the frost point Tfrost+α2 (TXObaseQtgt<(Tfrost+α2)). This α2 is a value to impart a margin to the frosting, and Tfrost+α2 is a value higher than or close to the frost point Tfrost. It is to be noted that in a case where the margin is not required, α2=0 may be defined to judge TXObaseQtgt<Tfrost in the step S21.

Further, in this embodiment, in a case where the requested refrigerant evaporation temperature in non-frosting TXObaseQtgt is smaller than the value (Tfrost+α2) close to the frost point Tfrost, the controller advances to step S22 to predict that the outdoor heat exchanger 7 is frosted when heating is performed in a radiator 4 by an operation of a compressor 2. It is to be noted that in the case of TXObaseQtgt≥(Tfrost+α2), the controller advances to step S23 to predict that the outdoor heat exchanger is not frosted.

In this way, the controller 32 calculates the requested refrigerant evaporation temperature in non-frosting TXObaseQtgt which is the refrigerant evaporation temperature of the outdoor heat exchanger when the requested heating capability Qtgt is achieved, and predicts that the outdoor heat exchanger 7 is frosted in a case where the requested refrigerant evaporation temperature in non-frosting TXObaseQtgt is lower than the frost point Tfrost or a temperature close to the frost point Tfrost. In consequence, on the basis of the frost point Tfrost at which the outdoor heat exchanger 7 is frosted, it is possible to effectively prevent or inhibit the frosting to the outdoor heat exchanger 7 during plug-in.

In this case, the controller 32 calculates the requested refrigerant evaporation temperature in non-frosting TXObaseQtgt on the basis of the outdoor air temperature Tam and the requested heating capability Qtgt, and hence, it is possible to precisely estimate the requested refrigerant evaporation temperature in non-frosting TXObaseQtgt to achieve the requested heating capability Qtgt when the outdoor heat exchanger 7 is not frosted, and it is possible to further effectively prevent or inhibit the frosting to the outdoor heat exchanger 7 during the plug-in.

(9) Other Embodiments of Injection Circuit

Next, the other constitutions of a vehicle air conditioner 1 of the present invention will be described with reference to FIG. 10 to FIG. 15.

Embodiment 3

(9-1) Example 1 of Injection Circuit

Figure 10:
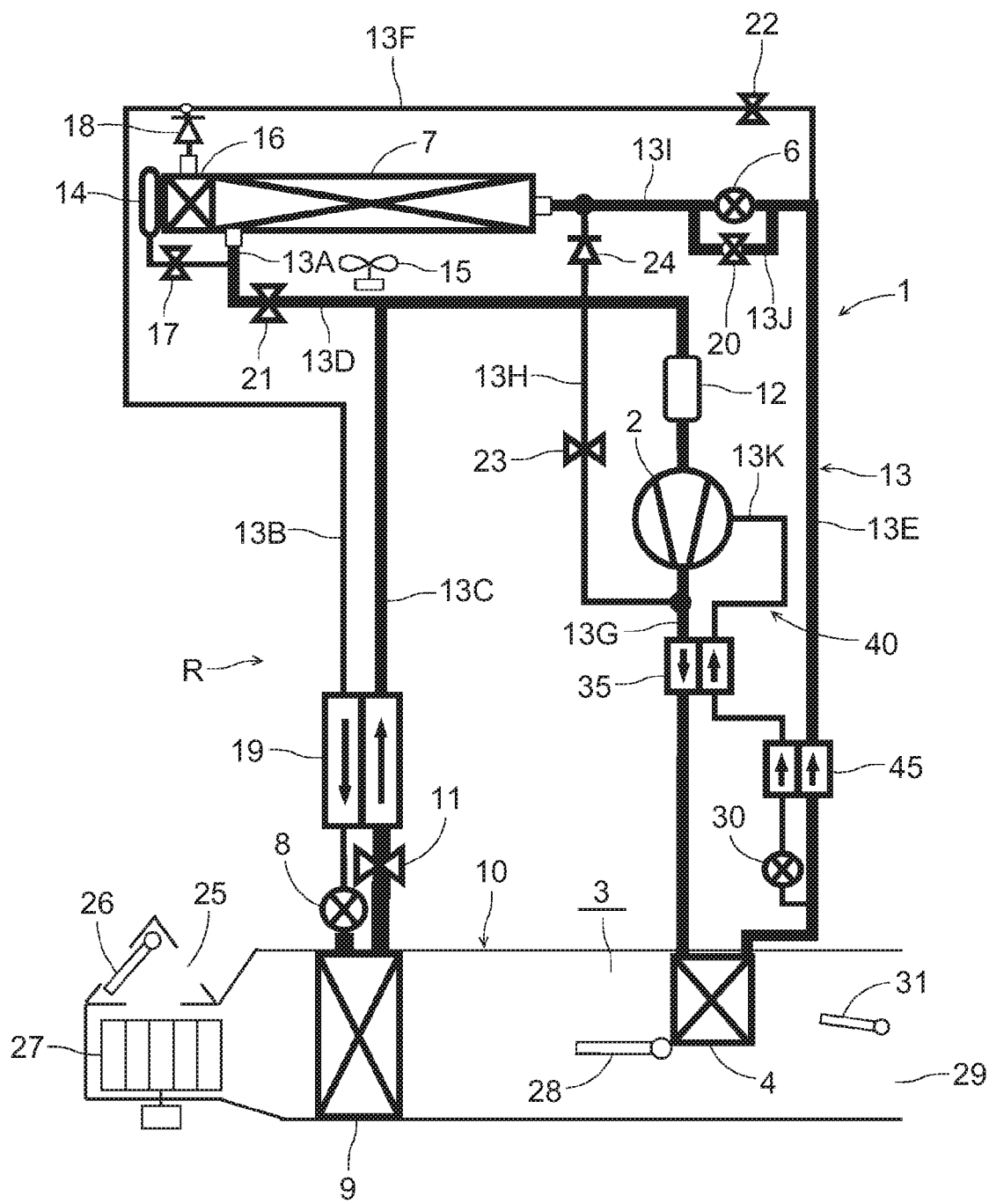
FIG. 10 is a constitutional view of a vehicle air conditioner of another embodiment of the present invention.

That is, FIG. 10 shows another constitutional view of the vehicle air conditioner 1 of the present invention. In this embodiment, an injection circuit 40 includes a radiator outlet side heat exchanger 45 between an injection expansion valve 30 and a discharge side heat exchanger 35 in the injection circuit 40 in addition to the constitution of FIG. 1. The radiator outlet side heat exchanger 45 performs heat exchange between a refrigerant decompressed by the injection expansion valve 30 and a refrigerant flowing out from a radiator 4 through a refrigerant pipe 13E toward an outdoor expansion valve 6. Further, the refrigerant (an injection refrigerant) flowing out from the radiator outlet side heat exchanger 45 flows into the discharge side heat exchanger 35.

In this way, the radiator outlet side heat exchanger is disposed in addition to the discharge side heat exchanger 35 in the injection circuit 40, so that the injection refrigerant to be returned to compression by a compressor 2 can be evaporated also by the heat exchange with the refrigerant flowing out from the radiator 4. In consequence, it is possible to inhibit the disadvantage that enthalpy of the refrigerant flowing into the radiator 4 for gas injection is unnecessarily decreased.

Embodiment 4

(9-2) Example 2 of Injection Circuit

Figure 11:
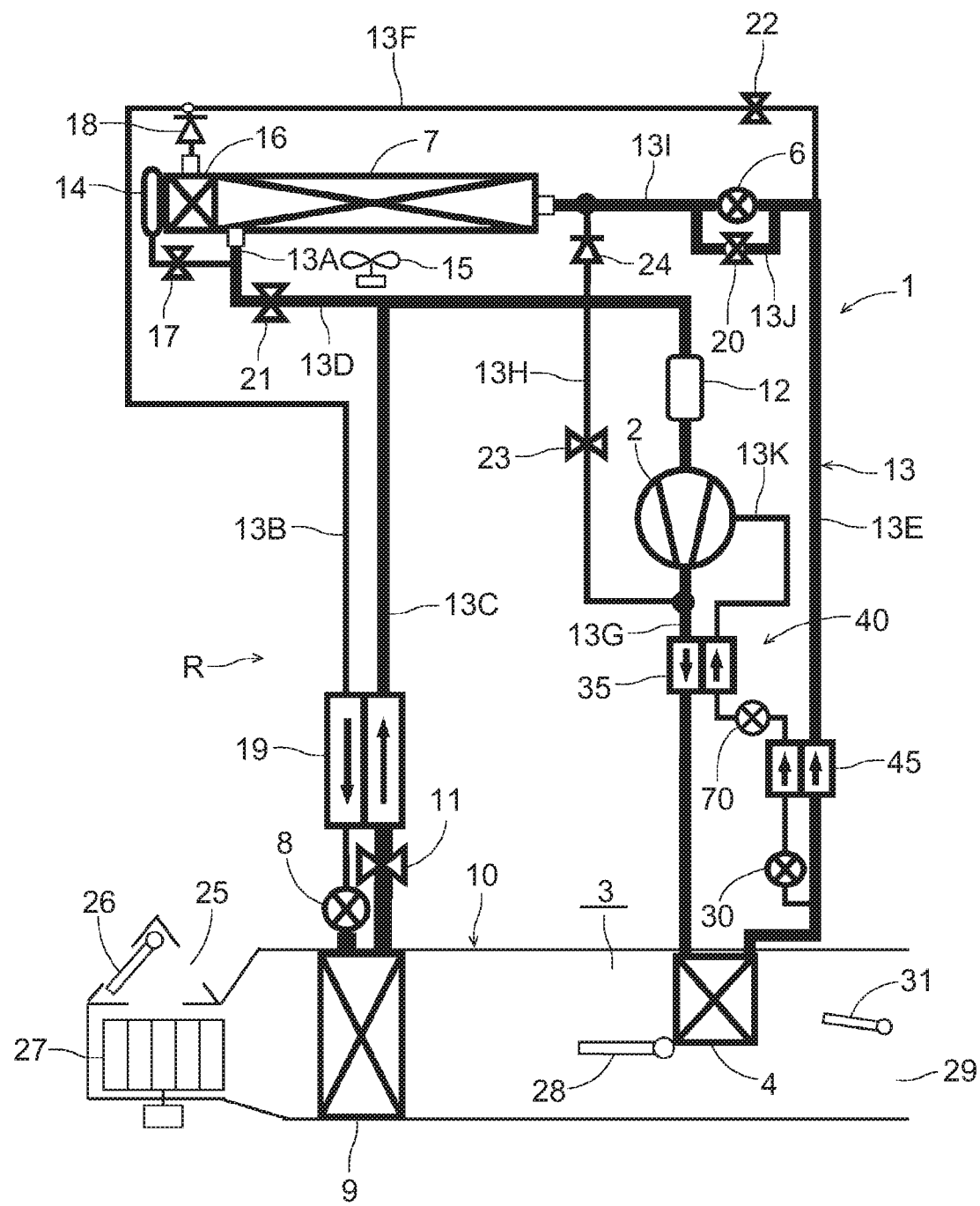
FIG. 11 is a constitutional view of a vehicle air conditioner of still another embodiment of the present invention.

Next, FIG. 11 shows still another constitutional view of the vehicle air conditioner 1 of the present invention. In this embodiment, an injection circuit 40 includes another injection expansion valve 70 (decompressing means) constituted of an electric valve on an outlet side of a radiator outlet side heat exchanger 45 in the injection circuit 40, i.e., between the radiator outlet side heat exchanger 45 and a discharge side heat exchanger 35 in addition to the constitution of FIG. 10. Further, in this case, a controller 32 controls a valve position of an injection expansion valve 30 on the basis of a refrigerant superheat degree in an outlet of the radiator outlet side heat exchanger 45, and controls a valve position of the injection expansion valve 70 on the basis of a refrigerant superheat degree on an outlet side of the discharge side heat exchanger 35.

According to such a constitution, in addition to the example of FIG. 10, evaporation of a refrigerant can accurately be controlled in the respective heat exchangers 45 and 35, and it is possible to accurately inhibit enthalpy deterioration of the refrigerant flowing into a radiator 4.

Embodiment 5

(9-3) Example 3 of Injection Circuit

Figure 12:
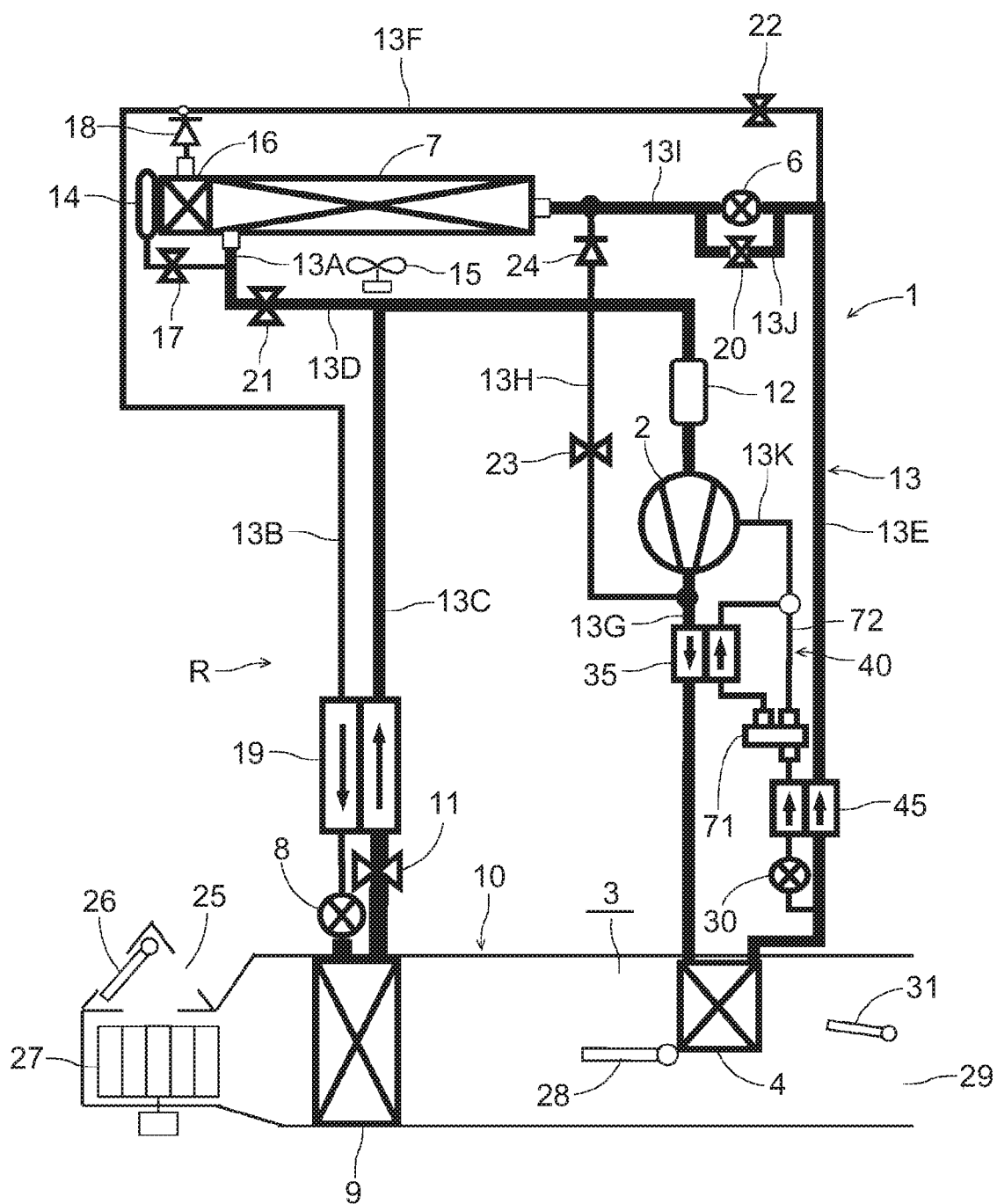
FIG. 12 is a constitutional view of a vehicle air conditioner of a further embodiment of the present invention.

Next, FIG. 12 shows a further constitutional view of the vehicle air conditioner 1 of the present invention. In this embodiment, an injection circuit 40 include a three-way valve 71 and a bypass pipe 72 (they constitute flow path control means) on an outlet side of a radiator outlet side heat exchanger 45 in the injection circuit 40 in addition to the constitution of FIG. 10. One outlet of the three-way valve 71 is connected to a discharge side heat exchanger 35, and the other output is connected to the bypass pipe 72, whereby the bypass pipe 72 is connected to a refrigerant pipe 13K in parallel with the discharge side heat exchanger 35 to bypass the discharge side heat exchanger 35.

Further, the three-way valve 71 is controlled by a controller 32. The controller 32 executes the control to pass a refrigerant flowing out from the radiator outlet side heat exchanger 45 through the bypass pipe 72 by the three-way valve 71 usually in a case where gas injection is performed in a compressor 2, and to pass the refrigerant flowing out from the radiator outlet side heat exchanger 45 through the discharge side heat exchanger 35 by the three-way valve 71, for example, in a case where a heating capability Qhp of a radiator 4 mentioned above runs short to a requested heating capability Qtgt.

In this way, inflow of the refrigerant into the discharge side heat exchanger 35 is controlled by using the three-way valve 71 and the bypass pipe 72 during the gas injection, so that heat exchange with the discharge side heat exchanger 35 can be utilized only in the case where the heating capability runs short, the disadvantage that enthalpy of the refrigerant flowing into the radiator 4 for the gas injection deteriorates can precisely be eliminated, and improvement of an operation efficiency can be achieved while improving the heating capability.

Embodiment 6

(9-4) Example 4 of Injection Circuit

Figure 13:
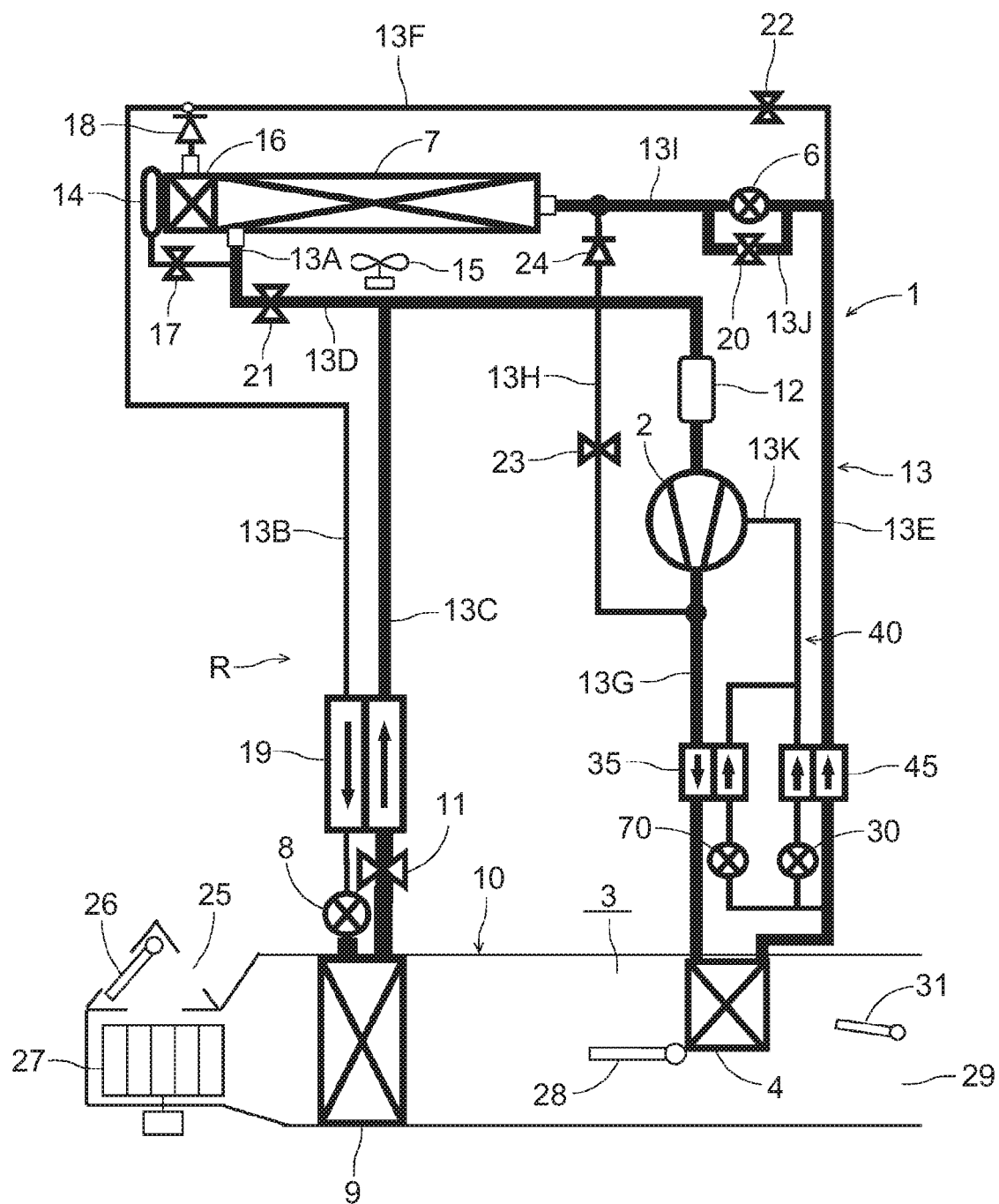
FIG. 13 is a constitutional view of a vehicle air conditioner of a further embodiment of the present invention.

Next, FIG. 13 shows a further constitutional view of the vehicle air conditioner 1 of the present invention. In the above constitution of FIG. 11, a radiator outlet side heat exchanger 45 and a discharge side heat exchanger 35 are connected in series in an injection circuit 40, but in this embodiment, a radiator outlet side heat exchanger 45 and a discharge side heat exchanger 35 are connected in parallel in an injection circuit 40, and injection refrigerants flowing into the respective heat exchangers are decompressed by respective injection expansion valves 30 and 70.

Further, valve positions of the respective injection expansion valves 30 and 70 are independently controlled by using refrigerant superheat degrees on outlet sides of the respective heat exchangers 45 and 35, and furthermore, the respective expansion valves 30 and 70 are dependently adjusted at shut off positions, so that it is possible to precisely and independently adjust inflow of the refrigerants into the respective heat exchangers 45 and 35 and flow rates of the refrigerants in accordance with excess and shortage of a capability as in FIG. 12, and it is possible to more effectively perform enhancement of the heating capability and improvement of an operation efficiency.

Embodiment 7

(9-5) Example 5 of Injection Circuit

Figure 14:
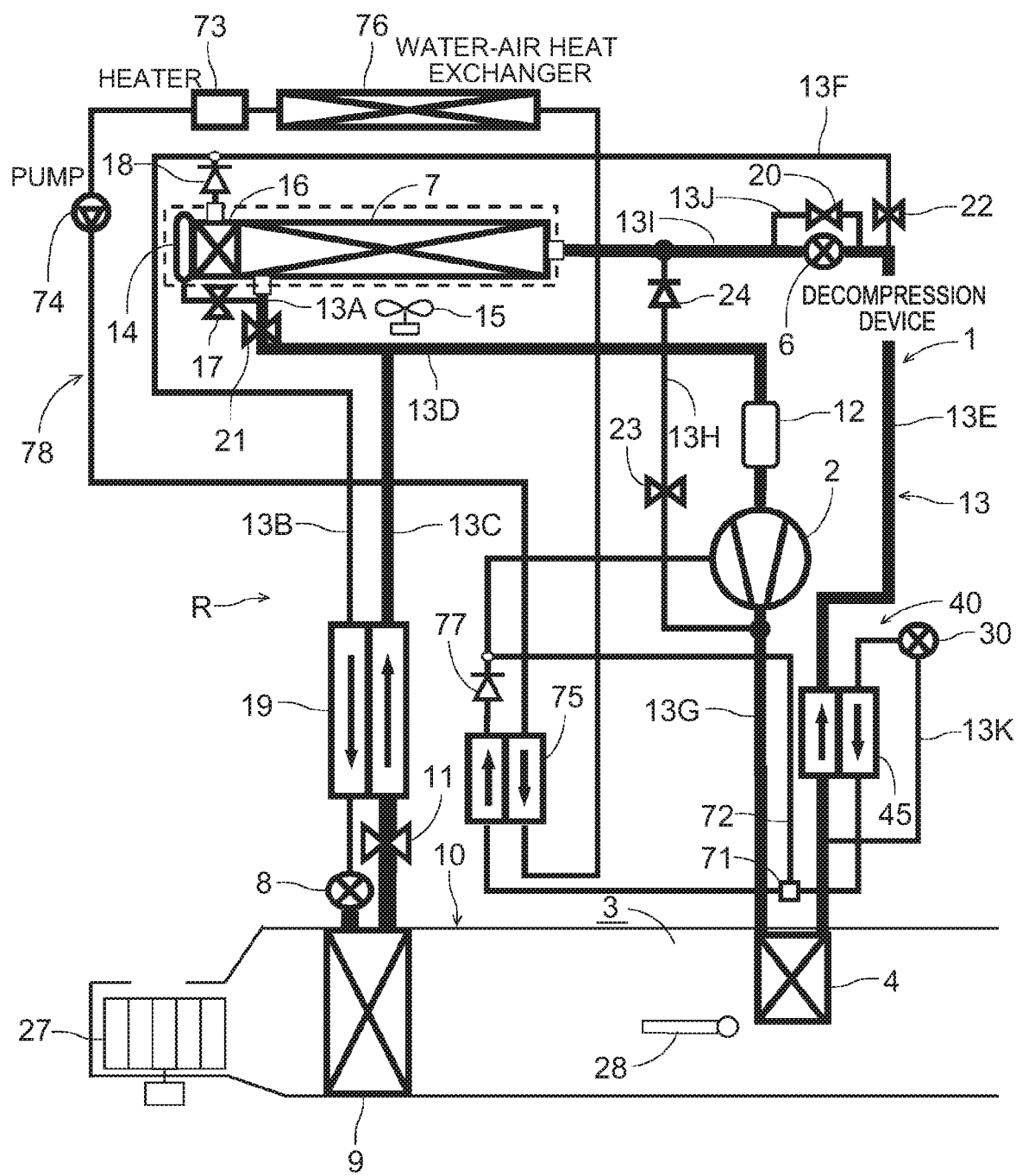
FIG. 14 is a constitutional view of a vehicle air conditioner of a further embodiment of the present invention.

Next, FIG. 14 shows a further constitutional view of the vehicle air conditioner 1 of the present invention. In the case of this embodiment, a discharge side heat exchanger 35 is not disposed in an injection circuit 40 as in FIG. 12 mentioned above. In this example, an injection circuit 40 includes a water-refrigerant heat exchanger 75 in place of the discharge side heat exchanger 35 in the constitution of FIG. 12. Further, in this embodiment, a water circulating circuit 78 is disposed in a vehicle air conditioner 1 in this embodiment.

The water circulating circuit 78 includes an electric heater 73 constituting heating means, a pump 74 constituting circulating means, and a water-air heat exchanger 76 disposed on an air inflow side of an outdoor heat exchanger 7. Additionally, the water-refrigerant heat exchanger 75 of the injection circuit 40 is connected to a downstream side of a three-way valve 71 in the same manner as in FIG. 12, and a bypass pipe 72 bypasses the water-refrigerant heat exchanger 75. It is to be noted that 77 is a check valve disposed in a refrigerant outlet of the water-refrigerant heat exchanger 75.

Further, water flowing through the water circulating circuit 78 flows through the water-refrigerant heat exchanger 75, and performs heat exchange with an injection refrigerant. Additionally, the electric heater 73 and the pump 74 are also controlled by a controller 32. The controller 32 heats the electric heater 73, and heats water in the water circulating circuit 78. This heated water (hot water) is supplied to the water-refrigerant heat exchanger 75 by the pump 74, and the injection refrigerant is heated to evaporate.

The water flowing out from the water-refrigerant heat exchanger 75 next flows into the water-air heat exchanger 76 to radiate heat in outdoor air. This radiated heat is pumped up by the outdoor heat exchanger 7, and therefore contributes to improvement of a heating capability, and further, this radiation inhibits frosting to the outdoor heat exchanger 7.

Embodiment 8

(9-6) Example 6 of Injection Circuit

Figure 15:
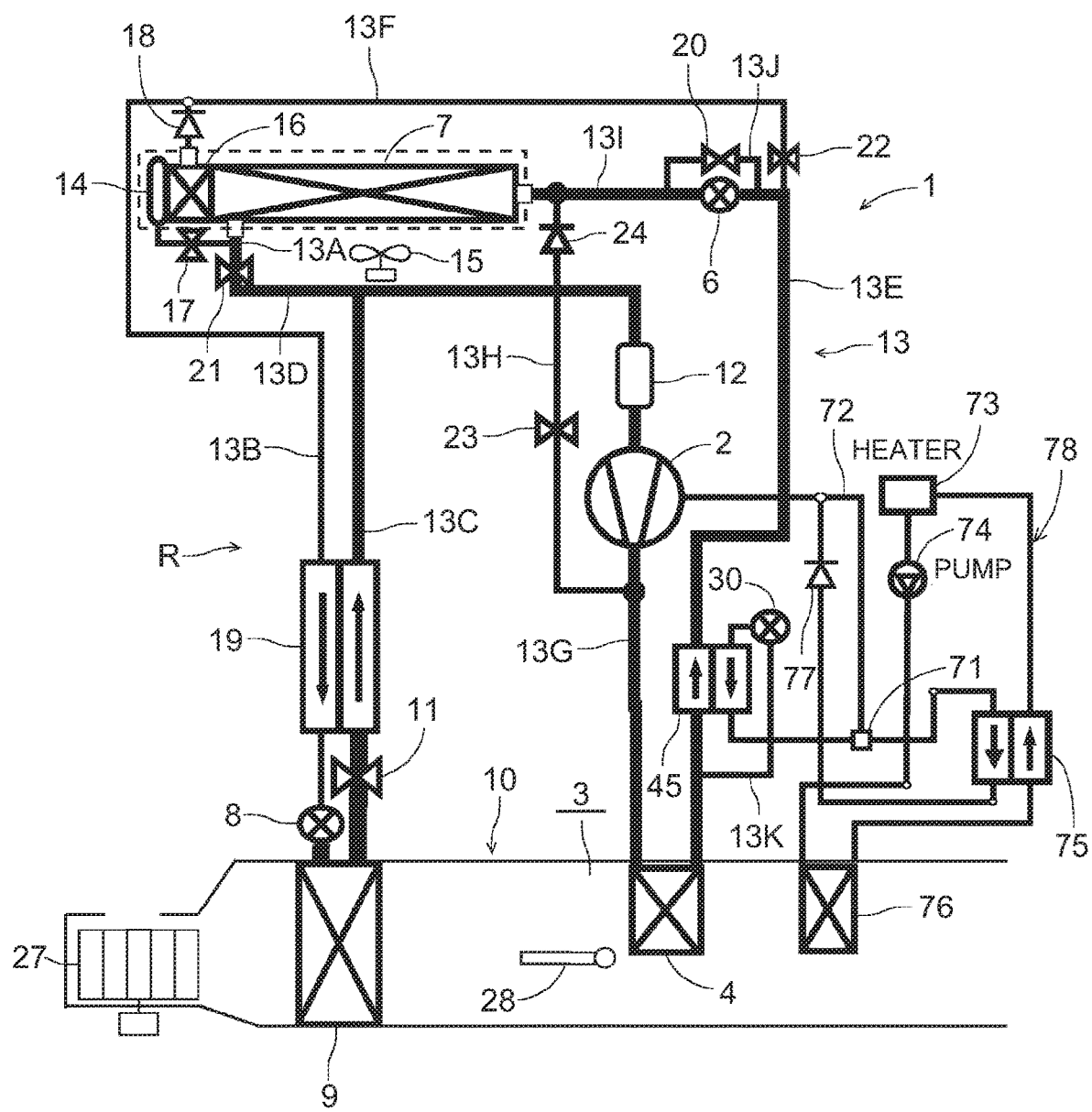
FIG. 15 is a constitutional view of a vehicle air conditioner of a still further embodiment of the present invention.

It is to be noted that a water-air heat exchanger 76 mentioned above may be disposed in an air flow passage 3 on an air downstream side of a radiator 4 as in FIG. 15. When the water-air heat exchanger is disposed in the air flow passage 3, the water-air heat exchanger 76 becomes a so-called heater core, and heating in a vehicle interior can be complemented.

It is to be noted that in the embodiment, a controller 32 which becomes frosting estimation means of an outdoor heat exchanger 7 performs frosting judgment to the outdoor heat exchanger 7 on the basis of a frost point Tfrost and a refrigerant evaporation temperature TXO of the outdoor heat exchanger 7 (step S4 of FIG. 6), but the embodiment is not limited to this example. For example, on the basis of the refrigerant evaporation temperature TXO (or a refrigerant evaporation pressure PXO) of the outdoor heat exchanger 7 and a refrigerant evaporation temperature TXObase (or a refrigerant evaporation pressure PXObase) of the outdoor heat exchanger 7 in non-frosting, the frosting may be estimated in a procedure similar to that in the case of Tfrost and TXO. Additionally, for example, an actual heating capability which is the actual heating capability of the radiator 4 may be compared with a heating capability in non-frosting which is the heating capability of the radiator 4 when the outdoor heat exchanger 7 is not frosted, and in a case where the actual heating capability is lower than the heating capability in non-frosting, it may be estimated that the outdoor heat exchanger 7 is frosted.

Additionally, in the embodiments, the present invention is applied to the vehicle air conditioner 1 which changes and executes the respective operation modes of the heating mode, the dehumidifying and heating mode, the dehumidifying and cooling mode and the cooling mode, but the present invention is not limited to the embodiments, and the present invention is also effective for a vehicle air conditioner which only performs the heating mode.

Furthermore, the constitution or each numeric value of the refrigerant circuit R described in the above respective embodiments are not limited to the embodiments, and needless to say, they can be changed without departing from the gist of the present invention.

DESCRIPTION OF REFERENCE NUMERALS 1 vehicle air conditioner
2 compressor
3 air flow passage
4 radiator
6 outdoor expansion valve
7 outdoor heat exchanger
8 indoor expansion valve
9 heat absorber
11 evaporation capability control valve
17, 20, 21 and 22 solenoid valve
23 solenoid valve (defrosting mode)
26 suction changing damper
27 indoor blower (blower fan)
28 air mix damper
30 and 70 injection expansion valve (an expansion valve)
32 controller (control means)
35 discharge side heat exchanger (a heat exchanger)
40 injection circuit
45 radiator outlet side heat exchanger
75 water-refrigerant heat exchanger
76 water-air heat exchanger
78 water circulating circuit
R refrigerant circuit

The invention claimed is:

1. A vehicle air conditioner comprising:
a compressor which compresses a refrigerant;
an air flow passage through which air to be supplied to a vehicle interior flows;
a radiator which lets the refrigerant radiate heat to heat the air to be supplied from the air flow passage to the vehicle interior;
a heat absorber which lets the refrigerant absorb heat to cool the air to be supplied from the air flow passage to the vehicle interior;
an outdoor heat exchanger disposed outside the vehicle interior to let the refrigerant absorb heat; and
control means,
the vehicle air conditioner executing at least a heating mode in which the control means controls the flow of refrigerant such that the refrigerant discharged from the compressor radiates heat in the radiator, the refrigerant by which heat has been radiated decompresses, and then the refrigerant absorbs heat in the outdoor heat exchanger, the vehicle air conditioner comprising:

an injection circuit which distributes the refrigerant flowing out from the radiator to return the refrigerant to the middle of the compression by the compressor, wherein the control means has frosting estimation means for estimating frosting to the outdoor heat exchanger, and when the heating mode is executed in a state where a power is supplied from an external power source to the compressor or a battery which supplies the power to drive the compressor, the control means operates the injection circuit, and executes gas injection to return the refrigerant to the middle of the compression by the compressor, in a case where the frosting to the outdoor heat exchanger is predicted on the basis of the estimation of the frosting estimation means, wherein the frosting estimation means calculates a maximum heating capability predicted value without frosting TGQhpNfst which is a target value of the maximum heating capability generable by the radiator in a range in which the outdoor heat exchanger is not frosted, and the frosting estimation means predicts that the outdoor heat exchanger is frosted in a case where the maximum heating capability predicted value without frosting TGQhpNfst is smaller than a requested heating capability Qtgt as the heating capability of the radiator which is requested or a value close to the requested heating capability Qtgt.

2. The vehicle air conditioner according to claim 1, wherein the frosting estimation means calculates the maximum heating capability predicted value without frosting TGQhpNfst on the basis of an outdoor air temperature, or time, solar radiation, a rainfall, a location and weather conditions in addition to the outdoor air temperature.

3. The vehicle air conditioner according to claim 1, wherein the control means suppresses a number of revolution of the compressor to a predetermined value or less, and increases a gas injection amount by the injection circuit, in the case where the frosting to the outdoor heat exchanger is predicted.

4. The vehicle air conditioner according to claim 3, wherein the control means raises a subcool degree of the refrigerant in the radiator and/or decreases a volume of the air to be passed through the air flow passage, in the case where the frosting to the outdoor heat exchanger is predicted.

5. The vehicle air conditioner according to claim 1, wherein the control means decreases a volume of the air to be passed through the outdoor heat exchanger, in the case where the frosting to the outdoor heat exchanger is predicted.

6. The vehicle air conditioner according claim 1, wherein the control means compares the requested heating capability Qtgt as the heating capability of the radiator which is requested with a heating capability Qmaxhp generable by the radiator in a case where it is predicted that the outdoor heat exchanger is not frosted, on the basis of the estimation of the frosting estimation means, and the control means executes the gas injection by the injection circuit in a case where the heating capability Qmaxhp is less than the requested heating capability Qtgt.

7. The vehicle air conditioner according to claim 1, wherein the injection circuit has decompressing means, and a heat exchanger which performs heat exchange between the refrigerant decompressed by the decompressing means and the refrigerant discharged from the compressor before flowing into the radiator or the refrigerant flowing out from the radiator.

* * * * *